United States Patent
Yamamura

(10) Patent No.: US 8,088,533 B2
(45) Date of Patent: Jan. 3, 2012

(54) FUEL CELL HAVING SEPARATOR WITH STOPPER

(75) Inventor: Hideichi Yamamura, Niiza (JP)

(73) Assignee: Honda Motor Co., Ltd., Tokyo (JP)

( * ) Notice: Subject to any disclaimer, the term of this patent is extended or adjusted under 35 U.S.C. 154(b) by 1243 days.

(21) Appl. No.: 11/666,767

(22) PCT Filed: Nov. 2, 2005

(86) PCT No.: PCT/JP2005/020494
§ 371 (c)(1),
(2), (4) Date: May 2, 2007

(87) PCT Pub. No.: WO2006/049314
PCT Pub. Date: May 11, 2006

(65) Prior Publication Data
US 2008/0124608 A1    May 29, 2008

(30) Foreign Application Priority Data
Nov. 2, 2004 (JP) .................................. 2004-319283

(51) Int. Cl.
*H01M 8/24* (2006.01)
(52) U.S. Cl. ........ 429/456; 429/457; 429/454; 429/466; 429/469
(58) Field of Classification Search ............... 429/452, 429/544–557, 463, 467, 469–471, 512–514, 429/516–519, 523, 454, 466; 502/101
See application file for complete search history.

(56) References Cited

U.S. PATENT DOCUMENTS

| 5,501,914 | A | 3/1996 | Satake et al. |
| 5,976,332 | A | 11/1999 | Hsu et al. |
| 2004/0043270 | A1 | 3/2004 | Tsunoda |
| 2004/0234837 | A1* | 11/2004 | Dan ............................... 429/38 |
| 2005/0142423 | A1 | 6/2005 | Homma et al. |

FOREIGN PATENT DOCUMENTS

| JP | 59-61479 | 4/1984 |
| JP | 1-63070 | 4/1989 |
| JP | 3-114147 | 5/1991 |
| JP | 3-129675 | 6/1991 |
| JP | 7-73887 | 3/1995 |

(Continued)

OTHER PUBLICATIONS

Japanese Office Action for Application No. 2004-319283, dated Nov. 10, 2009.

(Continued)

*Primary Examiner* — Barbara Gilliam
*Assistant Examiner* — Claire L Roe
(74) *Attorney, Agent, or Firm* — Nelson Mullins Riley & Scarborough LLP; Anthony A. Laurentano

(57) ABSTRACT

A fuel cell includes a plurality of electrolyte electrode assemblies and a pair of separators sandwiching the electrolyte electrode assemblies. A substantially ring shaped stopper is formed integrally with a plate of the separator. The stopper has a guide inclined surface, and the guide inclined surface contacts an anode inclined surface formed in an outer circumferential region of the anode of the electrolyte electrode assembly for preventing exposure of the anode to the exhaust gas.

13 Claims, 23 Drawing Sheets

FOREIGN PATENT DOCUMENTS

| | | |
|---|---|---|
| JP | 9-7616 | 1/1997 |
| JP | 2002-141083 | 5/2002 |
| JP | 2002-203579 | 7/2002 |
| JP | 2004-39254 | 2/2004 |
| JP | 2004-259649 | 9/2004 |
| WO | WO-2004004039 A1 | 1/2004 |

OTHER PUBLICATIONS

International Search Report for Application No. PCT/JP2005/020494, dated Jul. 26, 2007.

* cited by examiner

← EXHAUST GAS
←·— OXYGEN-CONTAINING GAS
←--- FUEL GAS

⟵ OXYGEN-CONTAINING GAS
⟵ FUEL GAS

⟵ OXYGEN-CONTAINING GAS
⟵ FUEL GAS

⇨ OXYGEN-CONTAINING GAS
⇨ FUEL GAS
⇨ EXHAUST GAS

FUEL CELL HAVING SEPARATOR WITH STOPPER

RELATED APPLICATIONS

This application is a 35 U.S.C. 371 national stage filing of International Application No. PCT/JP2005/020494, filed 2 Nov. 2005, which claims priority to Japanese Patent Application No. 2004-319283 filed on 2 Nov. 2004 in Japan. The contents of the aforementioned applications are hereby incorporated by reference.

TECHNICAL FIELD

The present invention relates to a fuel cell formed by sandwiching an electrolyte electrode assembly between separators. The electrolyte electrode assembly includes an anode, a cathode, and an electrolyte interposed between the anode and the cathode.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly (unit cell). The electrolyte electrode assembly is interposed between separators (bipolar plates). In use, a predetermined numbers of the unit cells and the separators are stacked together to form a fuel cell stack.

In the fuel cell, a gas chiefly containing oxygen or the air (hereinafter also referred to as the "oxygen-containing gas") is supplied to the cathode. The oxygen in the oxygen-containing gas is ionized at the interface between the cathode and the electrolyte, and the oxygen ions ($O^{2-}$) move toward the anode through the electrolyte. A fuel gas such as a gas chiefly containing hydrogen (hereinafter also referred to as the "hydrogen-containing gas") or CO is supplied to the anode. The oxygen ions react with the hydrogen in the hydrogen-containing gas to produce water or react with CO to produce $CO_2$. Electrons released in the reaction flow through an external circuit to the cathode, creating a DC electric energy.

For example, in a solid oxide fuel cell disclosed in Japanese Laid-Open Patent Publication No. 2002-203579, as shown in FIG. 23, power generation cells 1 and separators 2 are stacked alternately. Each of the power generation cells 1 includes an electrolyte layer 1a of solid electrolyte, and a fuel electrode layer 1b and an air electrode layer 1c provided on both surfaces of the electrolyte layer 1a. An electrically conductive porous fuel electrode current collector 3 is interposed between the power generation cell 1 and one of separators 2 sandwiching the power generation cell 1, and an electrically porous air electrode current collector 4 is interposed between the power generation cell 1 and the other of the separators 2.

A fuel supply passage 5 and an air supply passage 6 are formed on the separators 2. The fuel supply passage 5 and the air supply passage 6 are provided at substantially the center of the separator 2. The fuel supply passage 5 is connected to a fuel hole 5a facing the fuel electrode current collector 3 on one surface of the separator 2, and the air supply passage 6 is connected to an air hole 6a facing the air electrode current collector 4 on the other surface of the separator 2.

In the structure, the fuel gas ($H_2$, CO or the like) flows through the fuel supply passage 5, and is discharged from substantially the central region of the separator 2 to the central region of the fuel electrode current collector 3. Therefore, the fuel gas flows through apertures in the fuel electrode current collector 3, and is supplied to the substantially central region of the fuel electrode layer 1b. Further, the fuel gas is guided by slits (not shown), and flows radially from the substantially central region to the outer region of the fuel electrode layer 1b.

In the meanwhile, the air flows through the air supply passage 6, and is discharged from the substantially central region of the separator 2 to the central region of the air electrode current collector 4. Therefore, the air flows through apertures in the air electrode current collector 4, and is supplied to the substantially central region of the air electrode layer 1c. Further, the air is guided by slits (not shown), and flows radially from the substantially central region to the outer region of the air electrode layer 1c. Thus, power generation is performed in each of the power generation cells 1.

In the conventional technique as described above, the fuel gas flows from the substantially central region to the outer region of the fuel electrode layer 1b, and the air flows from the substantially central region to the outer region of the air electrode layer 1c. Therefore, the unconsumed fuel gas and air are mixed together, and combusted around the outer region of the power generation cell 1. After combustion, the mixed gas is discharged to the outside as an exhaust gas. At this time, since the flow rate of the supplied air is larger than the flow rate of the supplied fuel gas, oxygen remains in the exhaust gas. The outer circumferential region of the power generation cell 1 is likely to be exposed to the oxygen remaining in the exhaust gas.

The fuel electrode layer 1b is made of metal such as nickel (Ni). The outer circumferential region (Ni) of the fuel electrode layer 1b is oxidized to NiO. The exhaust gas containing oxygen moves into the fuel electrode current collector 3. Thus, reduction reaction of Nio of the fuel electrode layer 1b is prevented. Since NiO has high electrical resistance, it reduces the effective surface area of the anode used for power generation. Thus, the overall power generation performance (efficiency) of the power generation cell 1 is lowered.

DISCLOSURE OF INVENTION

The present invention has been made to solve these types of problems, and an object of the present invention is to provide a fuel cell in which it is possible to avoid the effect by the exhaust gas discharged to the outside of an outer circumferential region of an electrolyte electrode assembly, and it is possible to achieve improvement in the power generation efficiency with simple and economical structure.

In the present invention, a fuel cell comprises an electrolyte electrode assembly and a pair of separators sandwiching the electrolyte electrode assembly. The electrolyte electrode assembly includes an anode, a cathode, and an electrolyte interposed between the anode and the cathode. A fuel gas is supplied from a central region to an outer circumferential region of the anode, an oxygen-containing gas is supplied to the cathode, and an exhaust gas as a mixed gas of the fuel gas and the oxygen-containing gas after consumption is discharged to the outside of an outer circumferential region of the electrolyte electrode assembly.

A stopper is formed integrally with the separator. The stopper contacts the anode in the outer circumferential region of the electrolyte electrode assembly to prevent the exposure of the anode to the exhaust gas.

Further, it is preferable that the stopper includes a guide inclined surface inclined from the side of the anode to the side of the cathode, toward the outside of the electrolyte electrode assembly. With the structure, the outer circumferential region of the anode of the electrolyte electrode assembly tightly contacts the guide inclined surface to achieve the desired air-tightness.

Further, it is preferable that the electrolyte electrode assembly includes an anode inclined surface on the outer circumferential region of the anode, and the anode inclined surface contacts the guide inclined surface. It is preferable that the inclination angle of the guide inclined surface is greater than the inclination angle of the anode inclined surface. With the structure, the anode tightly contacts the stopper. Thus, the exhaust gas does not flow around to the outer circumferential region of the anode.

Further, it is preferable that the stopper is formed by partially folding the separator. With the simple and economical structure, it is possible to prevent the entry of the exhaust gas into the anode.

Further, in the present invention, an elastically deformable stopper member is fixed to the separator. The stopper member contacts the anode in an outer circumferential region of the electrolyte electrode assembly to prevent the exposure of the anode to the exhaust gas.

Further, it is preferable that the separator comprises a single plate, first protrusions are provided on one surface of the separator to form a fuel gas channel for supplying the fuel gas along an electrode surface of the anode, and second protrusions are provided on the other surface of the separator to form an oxygen-containing gas channel for supplying the oxygen-containing gas along an electrode surface of the cathode.

Further, it is preferable that the separator includes first and second plates which are stacked together, a fuel gas channel for supplying the fuel gas to the anode, and an oxygen-containing gas channel for supplying the oxygen-containing gas to the cathode are formed between the first and second plates such that the fuel gas flows along the anode facing one surface of the separator, and the oxygen-containing gas flows along the cathode facing the other surface of the separator.

Further, it is preferable that the separator includes first, second, and third plates which are stacked together, a fuel gas channel for supplying the fuel gas is formed between the first plate and the anode, an oxygen-containing gas channel for supplying the oxygen-containing gas is formed between the second plate and the cathode, and the third plate provided between the first and second plates divides the fuel gas channel and the oxygen-containing gas channel separately.

BEST MODE FOR CARRYING OUT THE INVENTION

Figure 1:
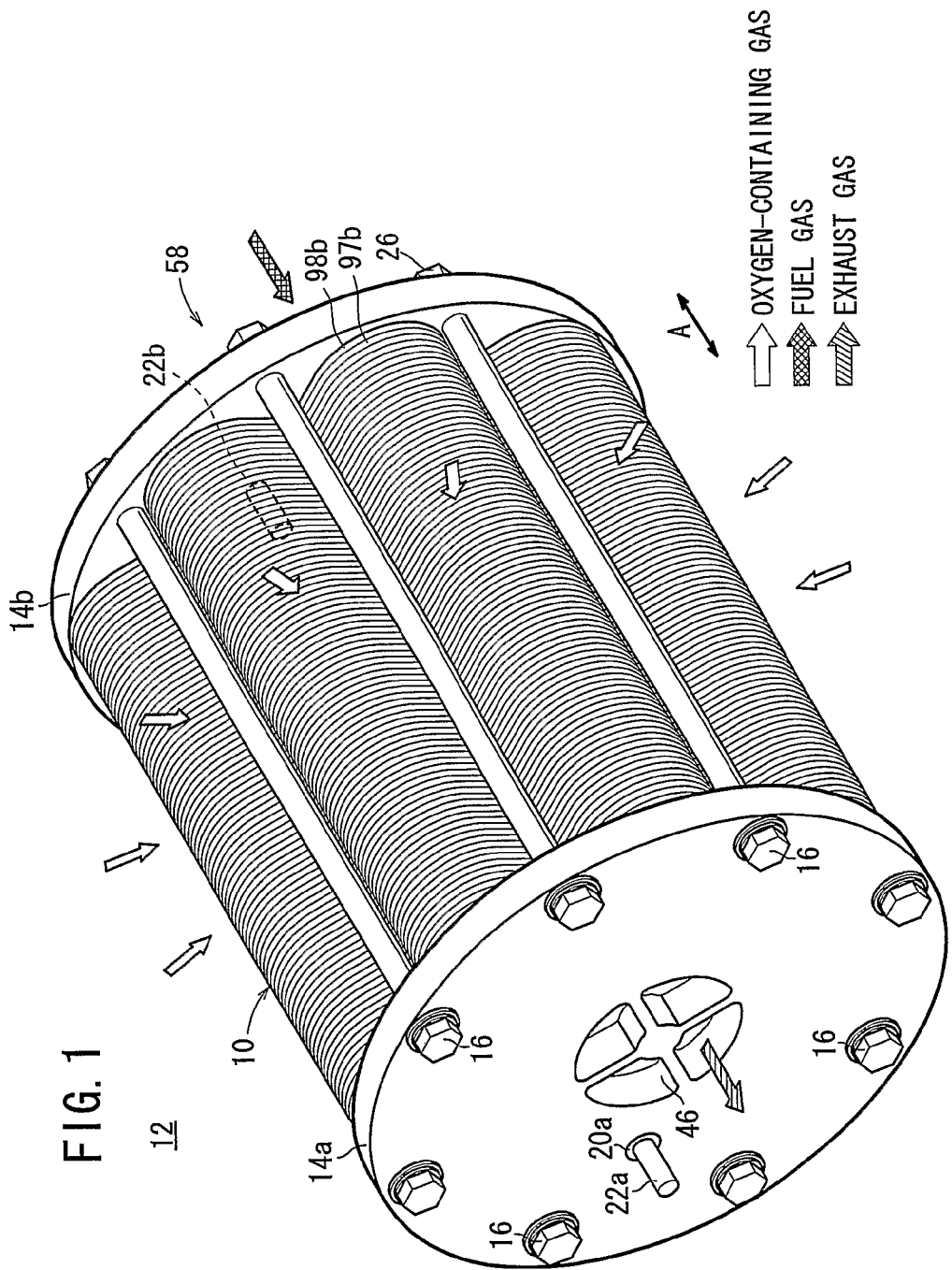
FIG. 1 is a perspective view schematically showing a fuel cell stack formed by stacking a plurality of fuel cells according to a first embodiment of the present invention.
Figure 2:
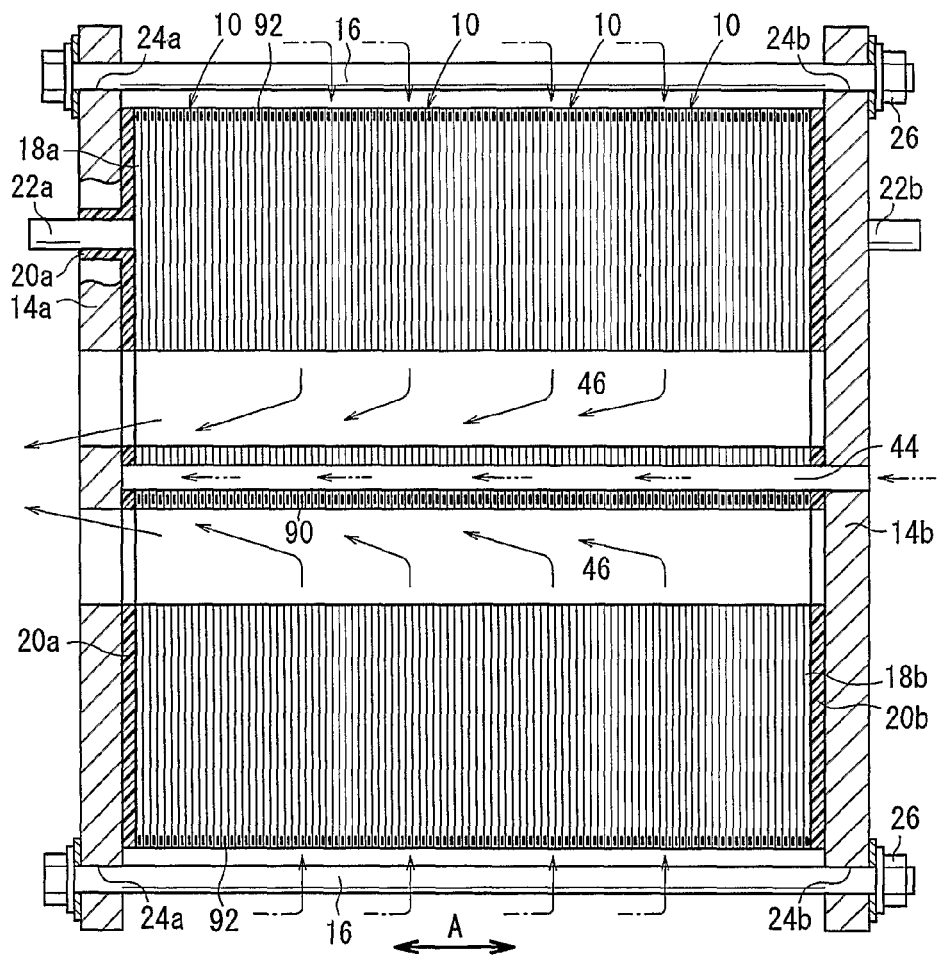
FIG. 2 is a partial cross sectional view showing the fuel cell stack.

FIG. 1 is a perspective view schematically showing a fuel cell stack 12 formed by stacking a plurality of fuel cells 10 according to a first embodiment of the present invention. FIG. 2 is a partial cross sectional view showing the fuel cell stack 12. The fuel cell 10 is a solid oxide fuel cell (SOFC) used in various applications, including stationary and mobile applications. For example, the fuel cell 10 is mounted on a vehicle.

As shown in FIG. 1, the fuel cells 10 of the fuel cell stack 12 are stacked in a direction indicated by an arrow A. Each of the fuel cells 10 has a shape of a circular disk having a curved outer section. At opposite ends of the fuel cells 10 in the stacking direction, end plates 14a, 14b are provided. For example, a plurality of, e.g., eight tightening bolts 16 are used for tightening components of the fuel cells 10 between the end plates 14a, 14b. At the center of the fuel cell stack 12, a circular fuel gas supply passage 44 is formed. The fuel gas supply passage 44 has a bottom at the end plate 14a, and extends in the direction indicated by the arrow A (see FIG. 2).

A plurality of (e.g., four) exhaust gas passages 46 are formed around the fuel gas supply passage 44. Each of the exhaust gas passages 46 has a bottom at the end plate 14b, and extends from the end plate 14b in the direction indicated by the arrow A. The end plates 14a, 14b are insulated from terminal plates 18a, 18b by insulating plates 20a, 20b interposed between the end plates 14a, 14b and the terminal plates 18a, 18b, respectively. Output terminals 22a, 22b extend from the terminal plates 18a, 18b, respectively. Bolts 16 are inserted into a plurality of holes 24a, 24b of the end plates 14a, 14b, respectively. Nuts 26 are fitted to the bolts 16 to apply a predetermined tightening force to each of the fuel cells 10 which are stacked together.

Figure 3:
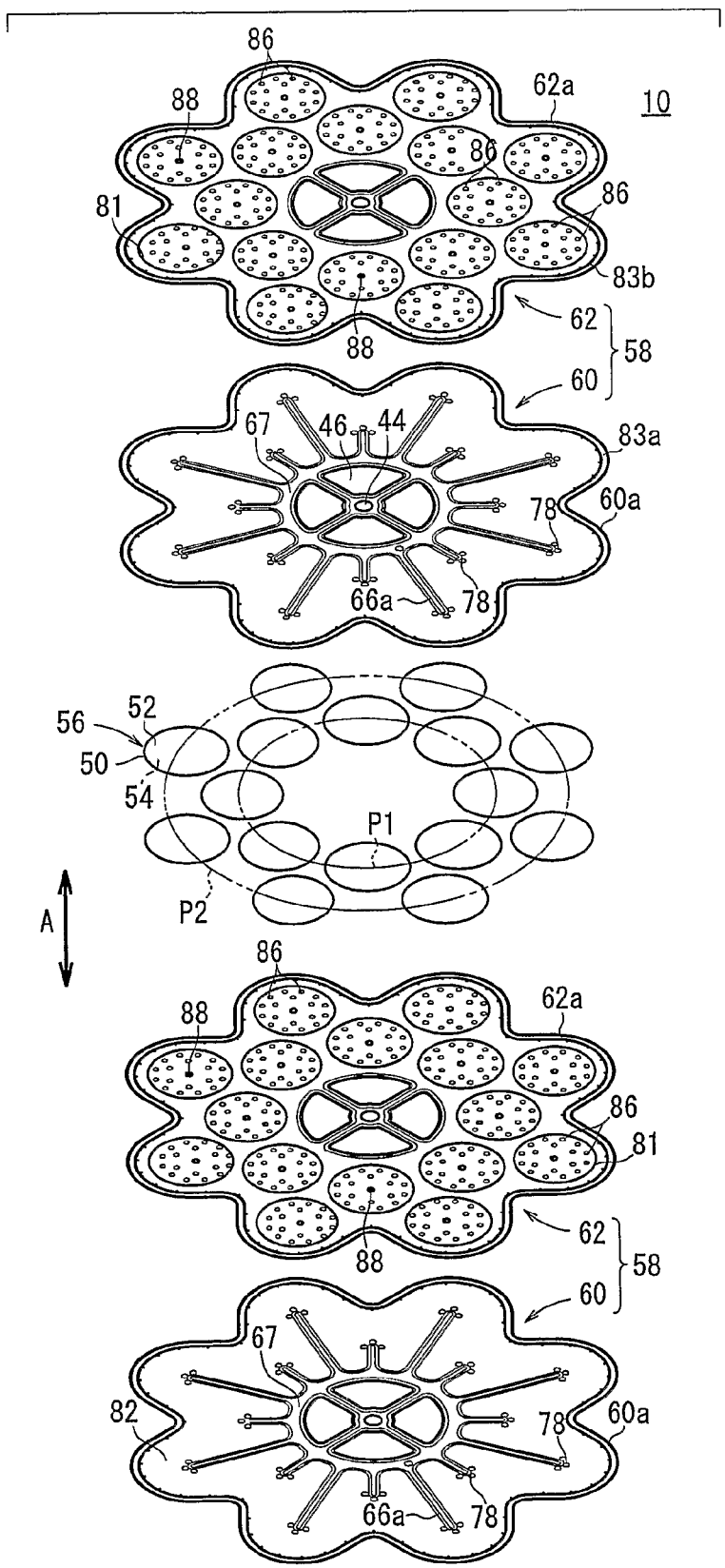
FIG. 3 is an exploded perspective view showing the fuel cell.
Figure 4:
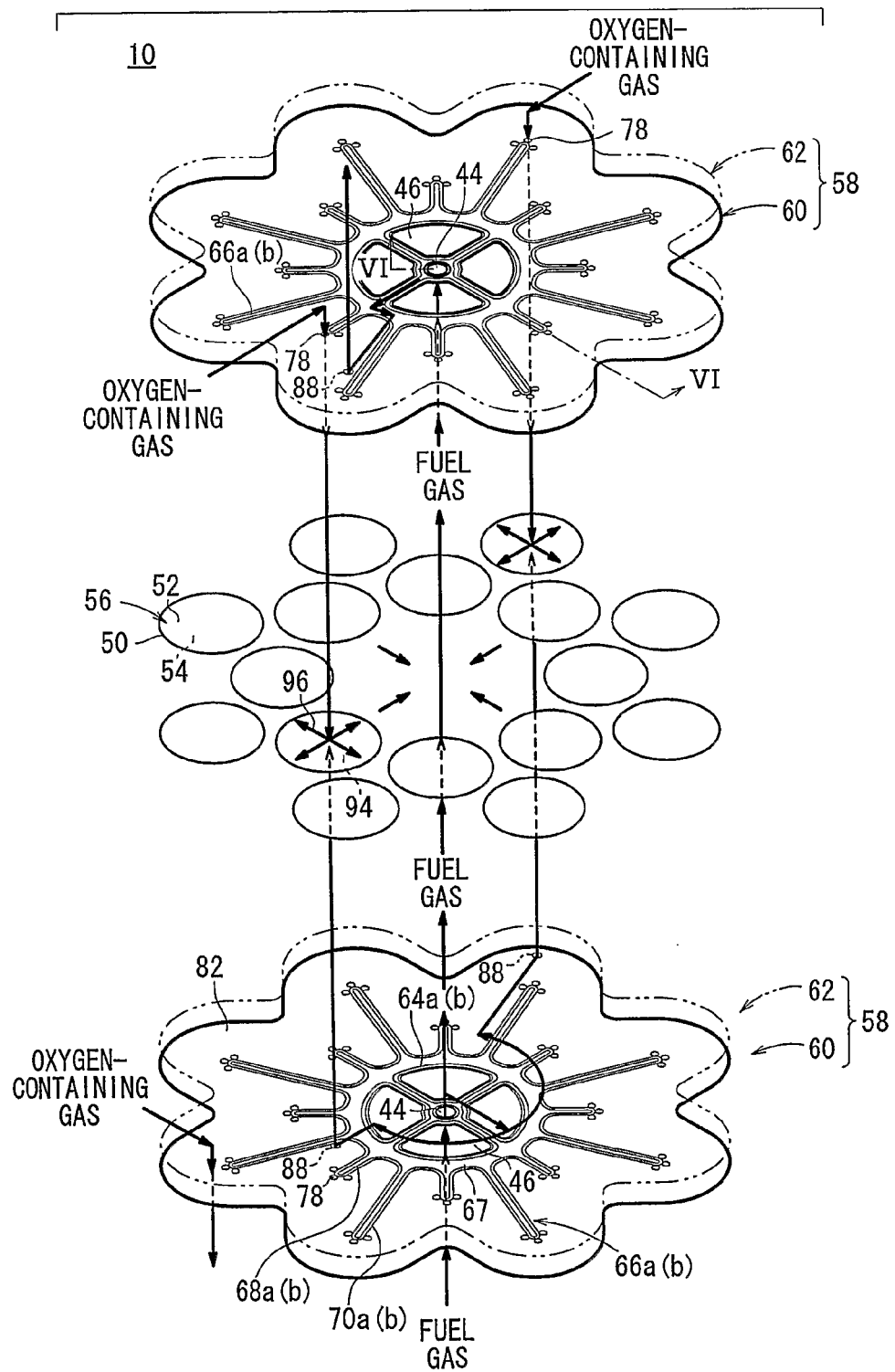
FIG. 4 is a partial exploded perspective view showing operation of the fuel cell.

As shown in FIGS. 3 and 4, the fuel cell 10 includes electrolyte electrode assemblies 56. Each of the electrolyte electrode assemblies 56 includes a cathode 52, an anode 54, and an electrolyte (electrolyte plate) 50 interposed between the cathode 52 and the anode 54. For example, the electrolyte 50 is made of ion-conductive solid oxide such as stabilized zirconia. The electrolyte electrode assembly 56 has a circular disk shape having a relatively small diameter.

Figure 5:
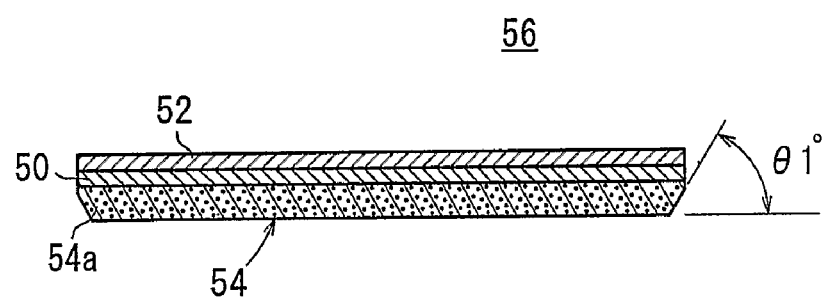
FIG. 5 is a cross sectional view showing an electrolyte electrode assembly of the fuel cell.

In FIG. 5, the anode 54 is made of porous material of Ni. The electrolyte electrode assembly 56 includes an inclined surface 54a in the outer circumferential region of the anode 54 (hereinafter referred to as the "anode inclined surface 54a". The inclination angle of the anode inclined surface 54a is θ1°. The anode inclined surface 54a may be extended up to the border between the anode 54 and the electrolyte 50.

As shown in FIGS. 3 and 4, a plurality of (e.g., 16) the electrolyte electrode assemblies 56 are interposed between a pair of separators 58 to form the fuel cell 10. The electrolyte electrode assemblies 56 are arranged along an inner circle P1 and an outer circle P2 which are concentric with the fuel gas supply passage 44 formed at the center of the separators 58. The inner circle P1 passes through centers of eight inner electrolyte electrode assemblies 56, and the outer circle P2 passes through centers of eight outer electrolyte electrode assemblies 56 (see FIG. 3).

Each of the separators 58 includes a plurality of (e.g., two) plates 60, 62 which are stacked together. Each of the plates 60, 62 is made of a stainless alloy, for example. Curved outer sections 60a, 62a are formed on the plates 60, 62, respectively.

Figure 6:
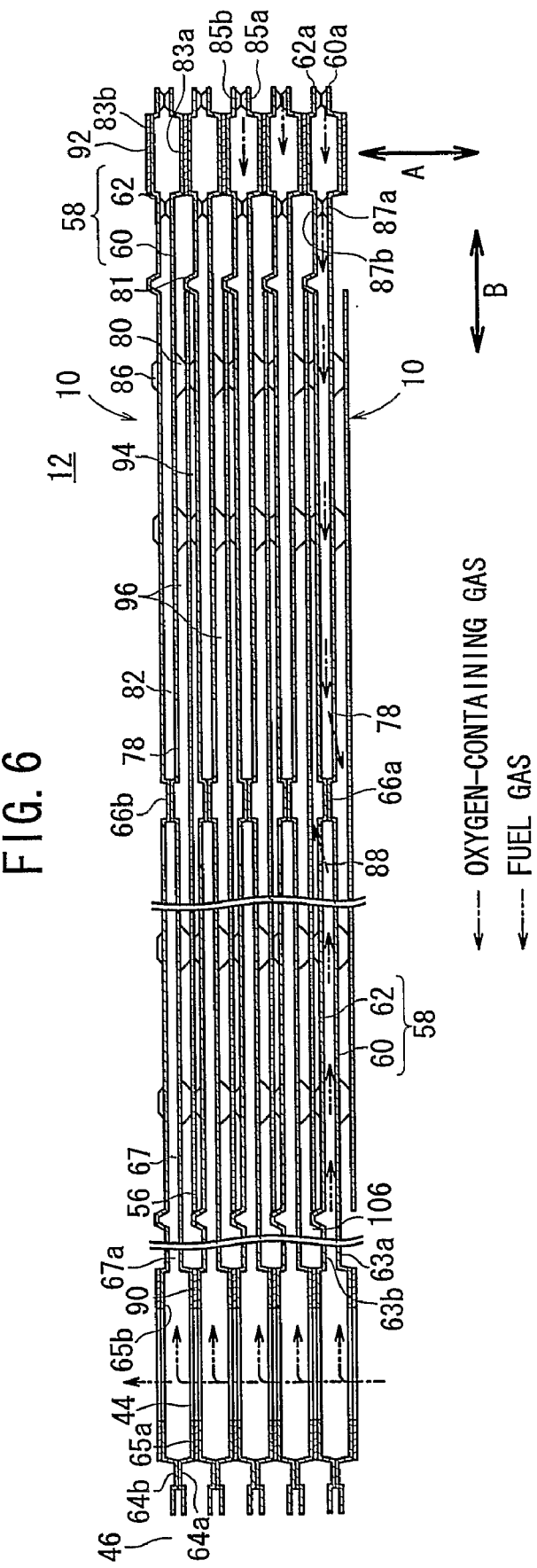
FIG. 6 is a cross sectional view, with partial omission, showing the fuel cell stack.
Figure 7:
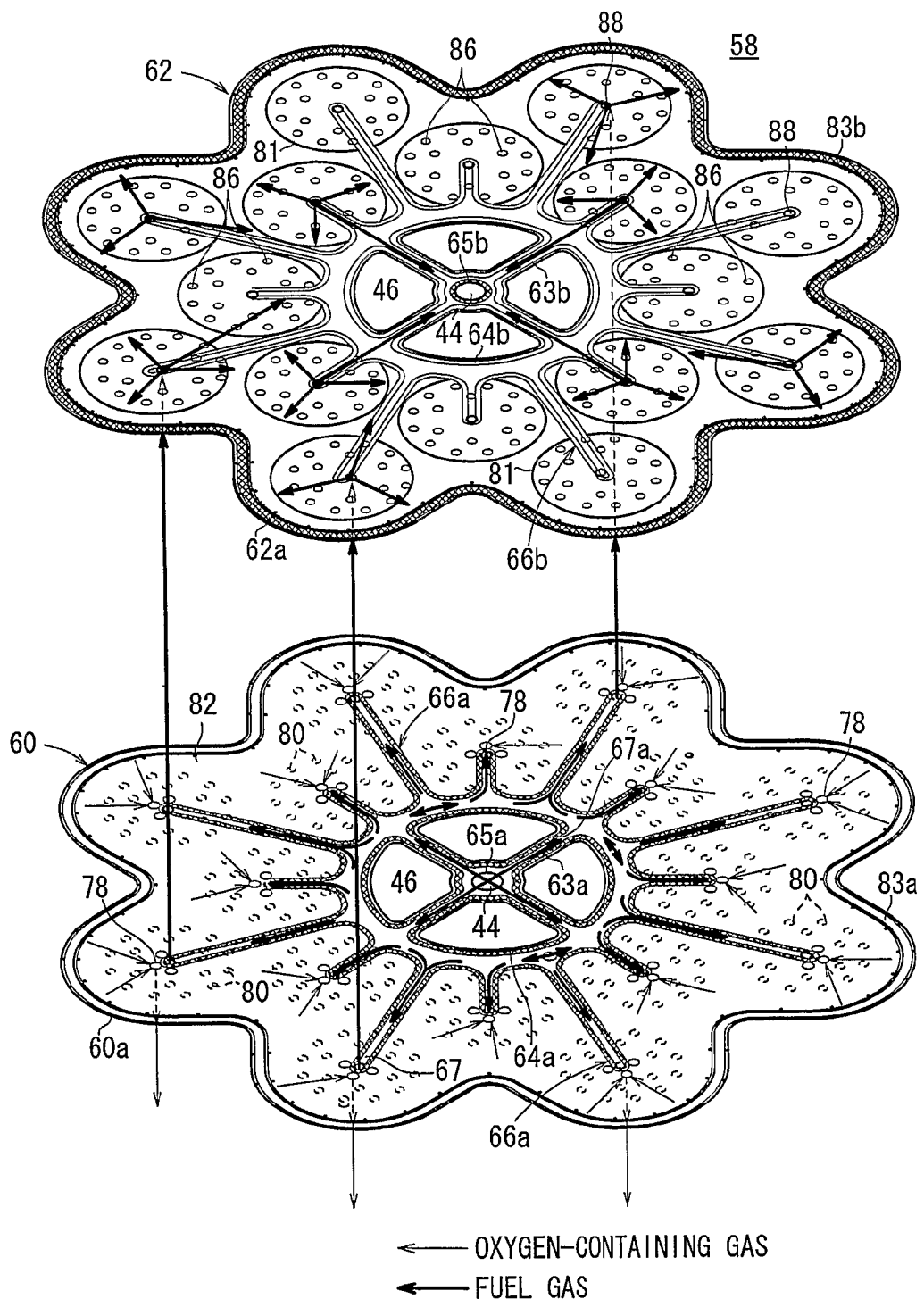
FIG. 7 is an exploded perspective view showing a separator of the fuel cell.
Figure 8:
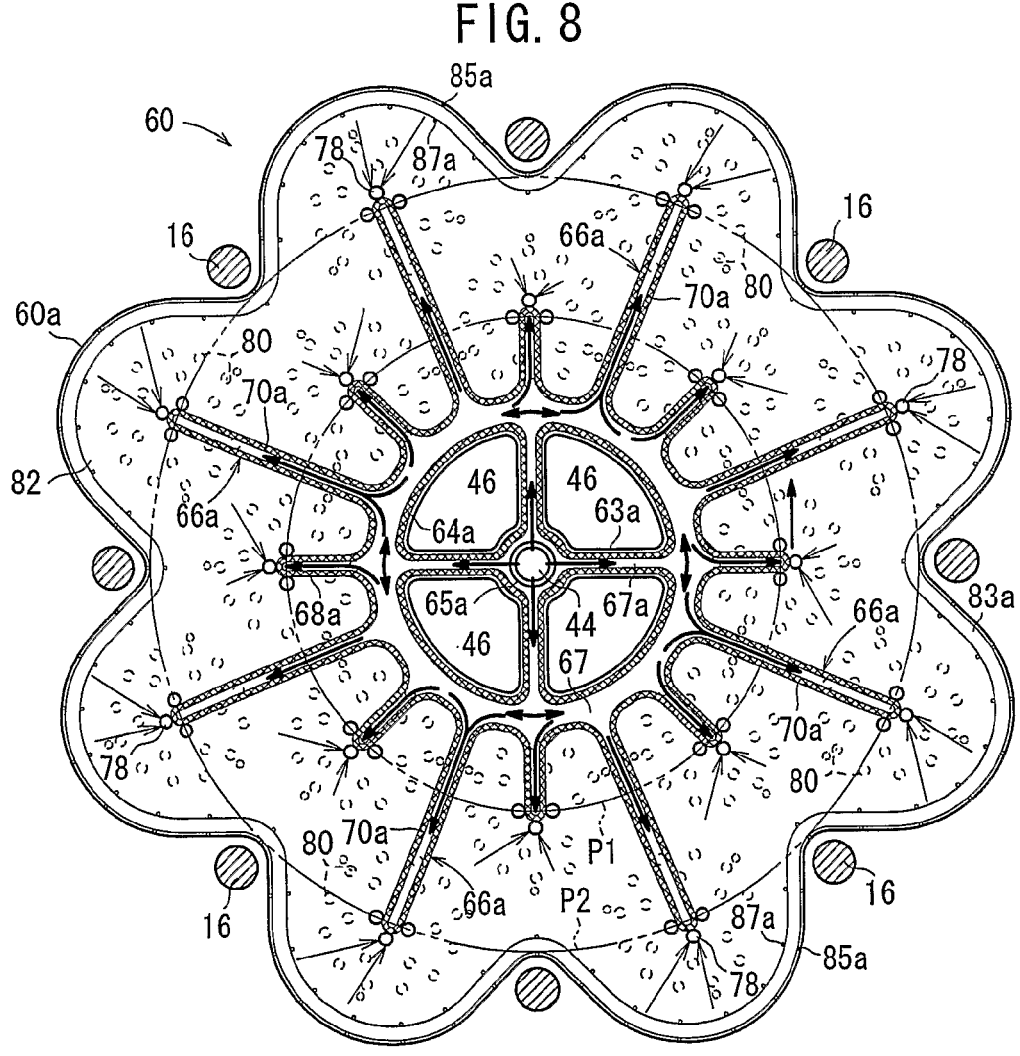
FIG. 8 is a front view showing one plate of the separator.

As shown in FIGS. 6 to 8, ribs 63a are provided around the center of the plate (first plate) 60 to form the fuel gas supply passage 44 and the four exhaust gas passages 46. The plate 60 has four inner ridges 64a around the respective exhaust gas passages 46. The inner ridges 64a protrude toward the plate (second plate) 62. The plate 60 has a protrusion 65a around the fuel gas supply passage 44. The protrusion 65a protrudes away from the plate 62 in a direction opposite to the inner ridges 64a.

An outer ridge 66a is formed radially outwardly around the fuel gas supply passage 44 on the plate 60. A fuel gas channel 67 is formed inside (between) the inner ridges 64a and the outer ridge 66a. The fuel gas channel 67 is connected to the fuel gas supply passage 44 through fuel gas distribution passages 67a. Each of the fuel gas distribution passages 67a extends between the exhaust gas passages 46 along the rib 63a, i.e., along a surface of the separator 58, in a direction indicated by an arrow B perpendicular to the stacking direction for connecting the fuel gas supply passage 44 and the fuel gas channel 67.

The outer ridge 66a includes a plurality of first walls 68a and second walls 70a each extending radially outwardly by a predetermined distance. The first walls 68a and the second walls 70a are formed alternately. As shown in FIG. 8, each of the first walls 68a extends to an inner circle P1 which is a virtual line passing through centers of eight inner electrolyte electrode assemblies 56. Each of the second walls 70a extends to an outer circle P2 which is a virtual line passing through centers of eight outer electrolyte electrode assemblies 56. The eight inner electrolyte electrode assemblies 56 are arranged along the inner circle P1, and the eight outer electrolyte electrode assemblies 56 are arranged along the outer circle P2.

At each end portion of the first walls 68a and at each end portion of the second walls 70a, three oxygen-containing gas inlets 78 are formed. The oxygen-containing gas inlets 78 are formed to pass through the plate 60. The plate 60 has first bosses 80 protruding toward, and contacting the electrolyte electrode assemblies 56 arranged along the inner circle P1 and the outer circle P2.

As shown in FIGS. 6 and 8, a first curved circumferential ridge 83a is formed on the plate 60 along the curved outer section 60a. The first circumferential ridge 83a has the shape identical to the curved outer section 60a, and protrudes away from the plate 62. Outer projections 85a and inner projections 87a are provided at predetermined intervals on opposite sides of the first circumferential ridge 83a to face each other.

Figure 9:
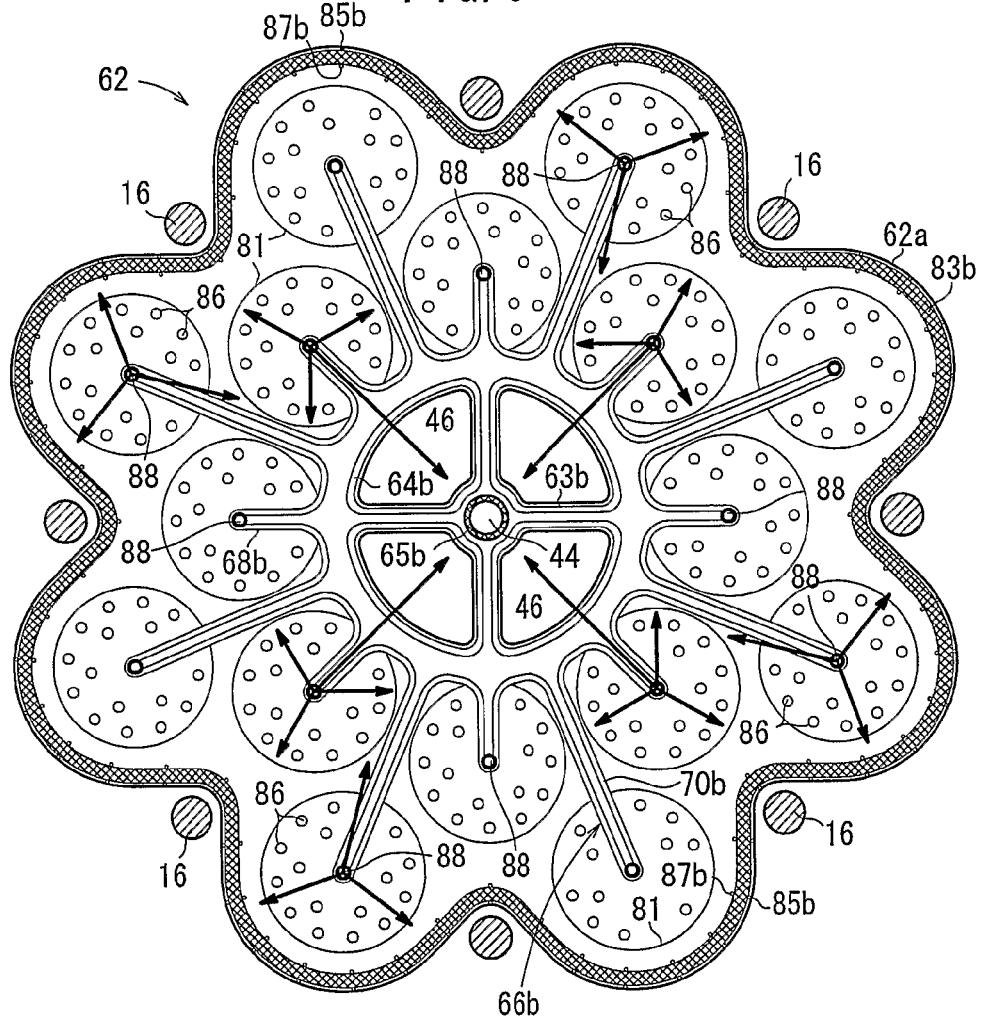
FIG. 9 is a front view showing the other plate of the separator.

As shown in FIGS. 6, 7, and 9, ribs 63b facing the ribs 63a of the plate 60 are provided around the center of the plate 62. The plate 62 has four inner ridges 64b protruding toward the plate 60, and a protrusion 65b protruding away from the plate 60 around the fuel gas supply passage 44. When the plates 60, 62 are connected together, a space extending through the protrusions 65a, 65b protruding away from each other forms the fuel gas supply passage 44.

An outer ridge 66b protruding toward the outer ridge 66a of the plate 60 is formed on the plate 62. The inner ridges 64a contact the inner ridges 64b, and the outer ridge 66a contacts the outer ridge 66b to form the fuel gas channel 67 between the plate 60 and the plate 62. The fuel gas channel 67 is connected to the fuel gas supply passage 44 through the fuel gas distribution passages 67a. The outer ridge 66b includes a plurality of first walls 68b and second walls 70b each extending radially outwardly by a predetermined distance. The first walls 68b and the second walls 70b are formed alternately.

Further, the plate 62 has second bosses 86 protruding toward, and contacting the electrolyte electrode assemblies 56 arranged along the inner circle P1 and the outer circle P2. The second bosses 86 have small dimensions (height and diameter) in comparison with the first bosses 80. Fuel gas inlets 88 are formed to pass through the plate 62. The fuel gas inlets 88 are connected to the fuel gas channel 67.

Figure 10:
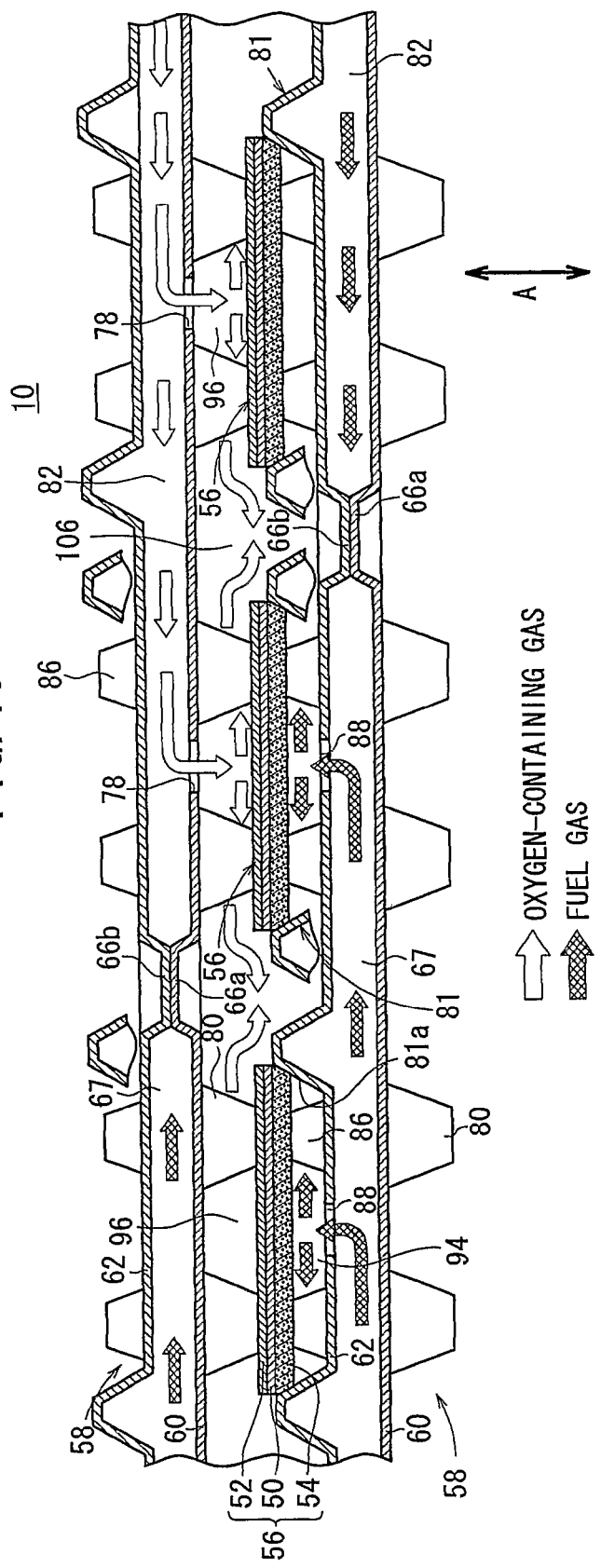
FIG. 10 is a cross sectional view schematically showing operation of the fuel cell.

Stoppers 81 for positioning the eight electrolyte electrode assemblies 56 along the inner circle P1 and the eight electrolyte electrode assemblies 56 along the outer circle P2 are provided integrally with the plate 62. As shown in FIG. 10, each of the stoppers 81 contacts the anode inclined surface 54a formed in the outer circumferential region of the anode 54 of each of the electrolyte electrode assemblies 56, and functions to prevent the exposure of the anode 54 to the exhaust gas.

Figure 11:
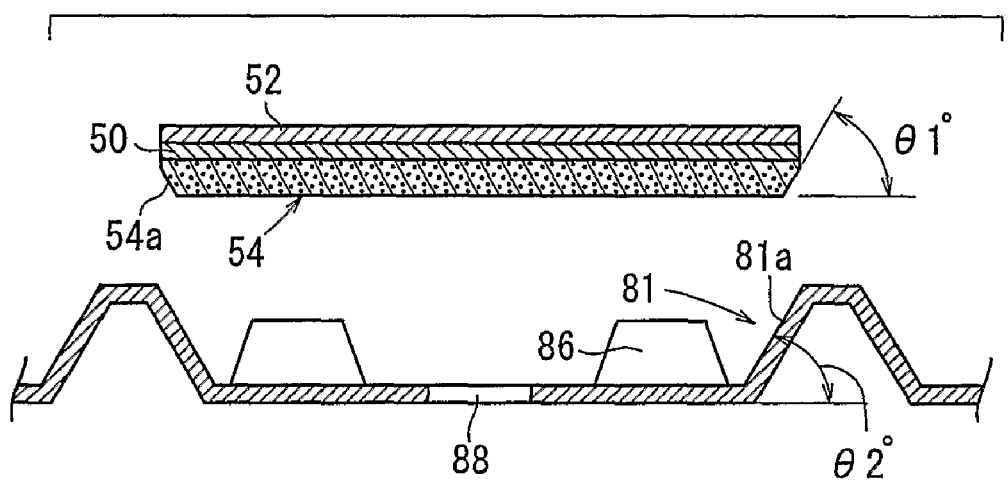
FIG. 11 is a view showing the state in which a stopper is spaced away from the electrolyte electrode assembly.

As shown in FIG. 11, a guide inclined surface 81a is formed along the inner circumferential surface of the stopper 81. The guide inclined surface 81a is inclined from the side of the anode 54 to the side of the cathode 52, toward the outer circumferential region of the electrolyte electrode assembly 56. The inclination angle θ2° of the guide inclined surface 81a is equal to, or greater than the inclination angle θ1° of the anode inclined surface 54a (θ1°≦θ2°).

As shown in FIGS. 6 and 9, a second circumferential ridge 83b is formed on the plate 62 along the curved outer section 62a. The second circumferential ridge 83b has the shape identical to the curved outer section 62a, and protrudes away from the plate 60. Outer projections 85b and inner projections 87b are provided at predetermined intervals on opposite sides of the second circumferential ridge 83b to face each other.

The fuel gas channel 67 is surrounded by the inner ridges 64a, 64b, and the outer ridges 66a, 66b between the plate 60 and the plate 62. An oxygen-containing gas channel 82 is formed outside the outer ridges 66a, 66b between the plate 60 and the plate 62 (see FIG. 10). The oxygen-containing gas channel 82 is connected to the oxygen-containing gas inlets 78 formed on the plate 60.

As shown in FIG. 6, the separator 58 has an insulator seal 90 for sealing the fuel gas supply passage 44. The insulator seal 90 is formed, for example, by placing a ceramics plate, or by thermally spraying ceramics to the protrusion 65a of the plate 60 or the protrusion 65b of the plate 62. The first circumferential ridge 83a of the plate 60 and the second circumferential ridge 83b of the plate 62 protrude away from each other, and forms a space between the first circumferential ridge 83a and the second circumferential ridge 83b as a part of the oxygen-containing gas channel 82. An insulator seal 92 made of ceramics or the like is provided on the first circumferential ridge 83a or the second circumferential ridge 83b by sandwiching the insulator seal 92 between the first circumferential ridge 83a and the second circumferential ridge 83b or by thermal spraying.

As shown in FIGS. 4 and 6, the electrolyte electrode assemblies 56 are interposed between the plate 60 of one separator 58 and the plate 62 of the other separator 58. Specifically, the plate 60 and the plate 62 outside the electrolyte electrode assemblies 56 has the first bosses 80 and the second bosses 86 protruding toward the electrolyte electrode assemblies 56 for sandwiching the electrolyte electrode assemblies 56.

As shown in FIG. 10, a fuel gas flow passage 94 connected to the fuel gas channel 67 through the fuel gas inlets 88 is formed between the electrolyte electrode assemblies 56 and the plate 62 of the separator 58. Further, an oxygen-containing gas flow passage 96 connected to the oxygen-containing gas channel 82 through the oxygen-containing gas inlets 78 is formed between the electrolyte electrode assemblies 56 and the plate 60 of the other separator 58 on the opposite side. The size of the opening of the fuel gas flow passage 94 depends on the height of the second bosses 86. The size of the opening of the oxygen-containing gas flow passage 96 depends on the height of the first bosses 80. The flow rate of the fuel gas is smaller than the flow rate of the oxygen-containing gas. Therefore, the dimensions of the second bosses 86 are smaller than the dimensions of the first bosses 80.

As shown in FIG. 6, the fuel gas channel 67 is connected to the fuel gas supply passage 44 extending through the protrusions 65a, 65b of the plates 60, 62 of the separator 58. The oxygen-containing gas channel 82 and the fuel gas channel 67 are formed on the same area inside the separator 58. The oxygen-containing gas channel 82 is open to the outside through the space between the first and second circumferential ridges 83a, 83b of the plates 60, 62 of the separator 58.

Each of the separators 58 stacked in the stacking direction has the first bosses 80 and the second bosses 86 for sandwiching the electrolyte electrode assemblies 56. The first bosses 80 and the second bosses 86 function as current collectors. The outer ridge 66a of the plate 60 is in contact with the outer ridge 66b of the plate 62, and the inner ridges 64a of the plate 60 is in contact with the inner ridges 64b of the plate 62 for serially connecting the fuel cells 10 in the direction indicated by the arrow A.

As shown in FIGS. 1 and 2, the fuel cells 10 are stacked in the direction indicated by the arrow A. Terminal plates 18a, 18b are stacked on the outermost fuel cells 10 at opposite ends. Insulating plates 20a, 20b are stacked on the outside of the terminal plates 18a, 18b, respectively, and the end plates 14a, 14b are stacked on the outside of the insulating plates 20a, 20b, respectively. The end plates 14a, 14b have holes 24a, 24b at positions corresponding to the inward curves of the curved outer sections 60a, 62a of the plates 60, 62. Bolts 16 are inserted in the holes 24a, 24b. Ends of the bolts 16 are screwed into nuts 26 for tightening the fuel cells 10 with a suitable force.

Next, operation of the fuel cell stack 12 will be described below.

In assembling the fuel cell 10, the plate 60 and the plate 62 are connected together to form the separator 58. Specifically, as shown in FIG. 6, the outer ridge 66a and the inner ridges 64a of the plate 60 are connected to the outer ridge 66b and the inner ridges 64b of the plate 62 by brazing, and the ring shaped insulator seal 90 is provided on the plate 60 or the plate 62 around the fuel gas supply passage 44 by thermal spraying, for example. Further, the insulator seal 92 having curves is provided on the first circumferential ridge 83a of the plate 60 or the second circumferential ridge 83b of the plate 62 by thermal spraying, for example.

The separator 58 thus formed has the fuel gas channel 67 and the oxygen-containing gas channel 82 on the same area between the plate 60 and the plate 62. The fuel gas channel 67 is connected to the fuel gas supply passage 44 through the fuel gas distribution passage 67a, and the oxygen-containing gas channel 82 between the curved outer section 60a and the curved outer section 62a is open to the outside.

Then, the electrolyte electrode assemblies 56 are interposed between a pair of separators 58. As shown in FIGS. 3 and 4, sixteen electrolyte electrode assemblies 56 are interposed between the plate 60 of one separator 58 and the plate 62 of the other separator 58. Eight electrolyte electrode assemblies 56 are arranged along the inner circle P1, and eight electrolyte electrode assemblies 56 are arranged along the outer circle P2.

The stoppers 81 are provided at the respective positions of the electrolyte electrode assembly 56. The outer circumferential regions of the electrolyte electrode assemblies 56 are supported by the stoppers 81. The first bosses 80 of the plate 60 and the second bosses 86 of the plate 62 protrude toward, and contact the electrolyte electrode assembly 56 inside the stopper 81 (see FIG. 6).

As shown in FIG. 10, the oxygen-containing gas flow passage 96 is formed between the cathodes 52 of the electrolyte electrode assemblies 56 and the plate 60. The oxygen-containing gas flow passage 96 is connected to the oxygen-containing gas channel 82 through the oxygen-containing gas inlets 78. The fuel gas flow passage 94 is formed between the anodes 54 of the electrolyte electrode assemblies 56 and the plate 62. The fuel gas flow passage 94 is connected to the fuel gas channel 67 through the fuel gas inlets 88. An exhaust gas channel 106 is formed between the separators 58 for guiding the exhaust gas (mixed gas of the fuel gas and the oxygen-containing gas after reaction) to the exhaust gas passages 46.

A plurality of the fuel cells 10 as assembled above are stacked in the direction indicated by the arrow A to form the fuel cell stack 12 (see FIGS. 1 and 2).

The fuel gas such as a hydrogen-containing gas is supplied to the fuel gas supply passage 44 of the end plate 14b of the fuel cell stack 12, and the oxygen-containing gas such as air is supplied from the outside of the fuel cell stack 12 under pressure. The fuel gas supplied to the fuel gas supply passage 44 flows in the stacking direction indicated by the arrow A, and is supplied to the fuel gas distribution passages 67a formed in each of the separators 58 of the fuel cells 10 (see FIG. 6).

As shown in FIG. 4, the fuel gas flows through the fuel gas channel 67 along the first walls 68a, 68b and the second walls 70a, 70b of the outer ridges 66a, 66b. The fuel gas flows into the fuel gas flow passage 94 through the fuel gas inlets 88 formed at end portions of the first walls 68a, 68b and the second walls 70a, 70b, i.e., at positions corresponding to central regions of the anodes 54 of the electrolyte electrode assemblies 56. The fuel gas supplied to the fuel gas flow passage 94 flows outwardly from the central regions of the anodes 54 (see FIG. 10).

The oxygen-containing gas is supplied to each of the fuel cells 10 from the outside. The oxygen-containing gas is supplied to the oxygen-containing gas channel 82 formed in each of the separators 58, between the plate 60 and the plate 62. The oxygen-containing gas supplied to the oxygen-containing gas channel 82 flows into the oxygen-containing gas flow passage 96 from the oxygen-containing gas inlets 78, and flows outwardly from central regions of the cathodes 52 of the electrolyte electrode assemblies 56 (see FIGS. 4 and 10).

Therefore, in each of the electrolyte electrode assemblies 56, the fuel gas is supplied to the central region of the anode 54, and flows outwardly from the central region of the anode 54. Similarly, the oxygen-containing gas is supplied to the central region of the cathode 52, and flows outwardly from the central region of the cathode 52. The oxygen-ions pass from the cathode 52 to the anode 54 through the electrolyte 50 to generate electricity by electrochemical reactions.

The electrolyte electrode assemblies 56 are sandwiched between the first bosses 80 and the second bosses 86. Therefore, the first bosses 80 and the second bosses 86 function as current collectors. The fuel cells 10 are electrically connected in series in the stacking direction indicated by the arrow A. The electricity can be outputted from the output terminals 22a, 22b. Even if some of the electrolyte electrode assemblies 56 have power failures, the fuel cell stack 12 can be energized by the other electrolyte electrode assemblies 56. Therefore, improvement in the reliability of the power generation is achieved.

After reaction of the fuel gas and the oxygen-containing gas, the exhaust gas moves outwardly from the central regions of the electrolyte electrode assemblies 56, and flows through the exhaust gas channel 106 between the separators 58 toward the center of the separators 58. The exhaust gas flows into the four exhaust gas passages 46 formed near the center of separators 58 as an exhaust gas manifold, and is discharged from the exhaust gas passages 46 to the outside.

At this time, normally, the oxygen-containing gas (air) is supplied to each of the electrolyte electrode assemblies 56 excessively. The unconsumed fuel gas is mixed with the oxygen-containing gas, and combusted around the electrolyte electrode assembly 56. The remaining oxygen after combustion is included in the exhaust gas. The outer circumferential region of the electrolyte electrode assembly 56, in particular, the outer circumferential region of the anode 54 is exposed to the exhaust gas. Therefore, the outer circumferential region of the anode 54 is likely to be oxidized easily.

In the electrolyte electrode assembly 56 according to the first embodiment, as shown in FIGS. 10 and 11, the substantially ring shaped stopper 81 is formed integrally with the plate 62 of the separator 58. The stopper 81 contacts the outer circumferential region of the electrolyte electrode assembly 56. Therefore, the exhaust gas discharged from the outer region of the electrolyte electrode assembly 56 does not flow around to the outer region of the anode 54. It is possible to prevent exposure of the anode 54 to the exhaust gas suitably.

Further, the guide inclined surface 81a is formed along the inner circumferential surface of the stopper 81. The guide inclined surface 81a contacts the outer circumferential region of the electrolyte electrode assembly 56. Thus, the outer circumferential region of the electrolyte electrode assembly 56 tightly contacts the stopper 81 to achieve the desired airtightness. Accordingly, the stopper 81 prevents the exhaust gas from flowing around to the outer circumferential region of the anode 54.

At this time, in the electrolyte electrode assembly 56, the anode inclined surface 54a is formed in the outer circumferential region of the anode 54. The inclination angle $\theta 1°$ of the anode inclined surface 54a is equal to, or smaller than the inclination angle $\theta 2°$ of the guide inclined surface 81a (see FIG. 11).

That is, if the inclination angle $\theta 1°$ is equal to the inclination angle $\theta 2°$, the substantially entire anode inclined surface 54a and the guide inclined surface 81a contact each other. Thus, the exposure of the anode 54 to the exhaust gas is prevented suitably. If the inclination angle $\theta 1°$ is smaller than the inclination angle $\theta 2°$, the anode inclined surface 54a and the guide inclined surface 81a contact at a position close to the electrolyte 50. Therefore, the exposure of the outer circumferential region of the anode 54 to the outside is prevented suitably. It is possible to achieve the sufficient effective surface area of the anode 54 desirably. The stopper 81 is formed integrally with the plate 62. Thus, the separator 58 has a simple and economical structure as a whole.

Further, as shown in FIG. 5, the area of the anode inclined surface 54a is limited to the border between the anode 54 and the electrolyte 50. Therefore, the cathode 52 does not contact the stopper 81. Thus, the short-circuit of the anode 54 and the cathode 52 through the stopper 81 does not occur.

Figure 12:
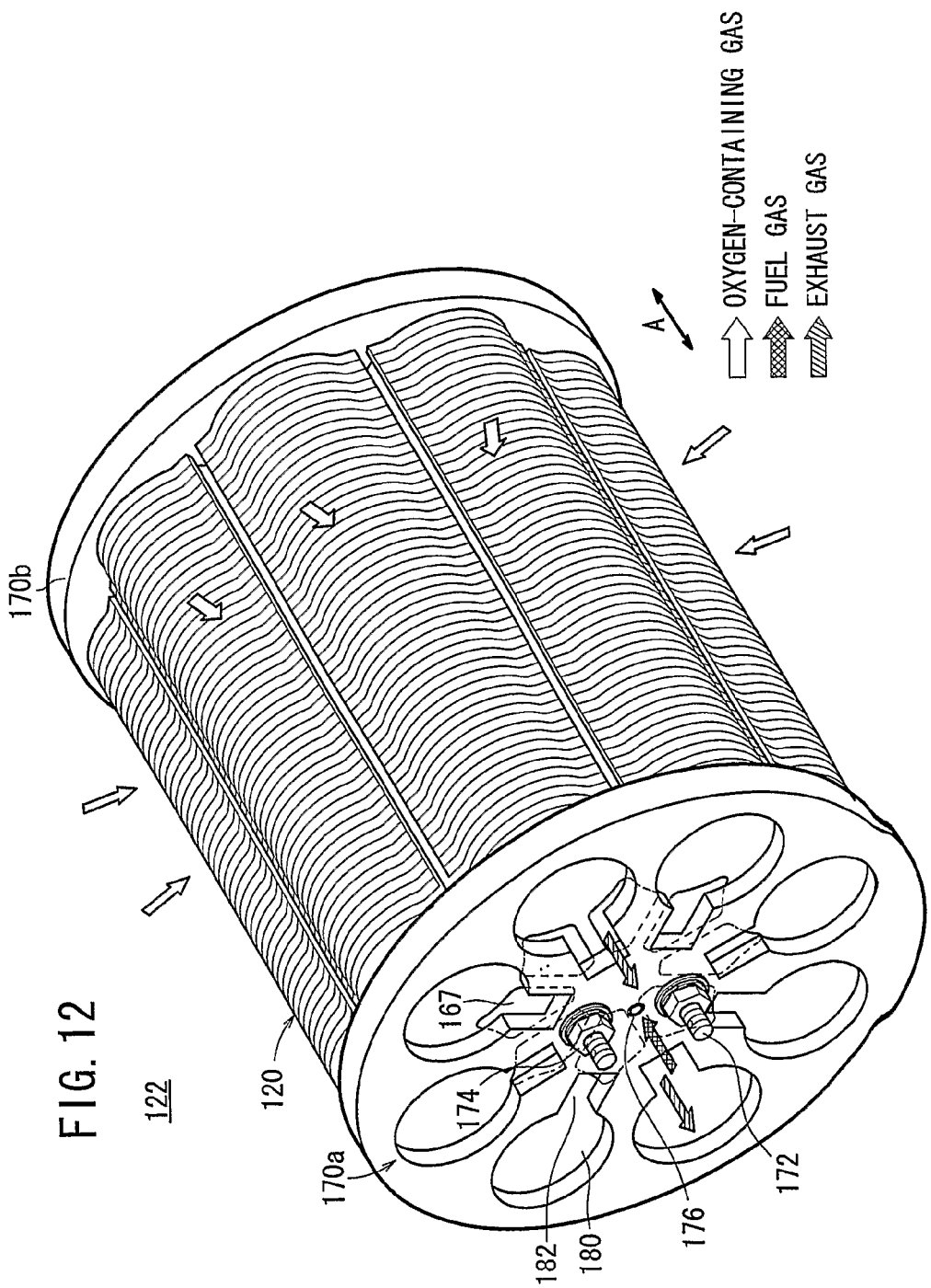
FIG. 12 is a perspective view schematically showing a fuel cell stack formed by stacking a plurality of fuel cells according to a second embodiment of the present invention.

FIG. 12 is a perspective view schematically showing a fuel cell stack 122 formed by stacking a plurality of fuel cells 120 according to a second embodiment of the present invention. The constituent elements that are identical to those of the fuel cell 10 and the fuel cell stack 12 according to the first embodiment are labeled with the same reference numeral, and description thereof will be omitted. In a third embodiment as described later, the constituent elements that are identical to those of the fuel cell 10 and the fuel cell stack 12 according to the first embodiment are labeled with the same reference numeral, and description thereof will be omitted.

Figure 13:
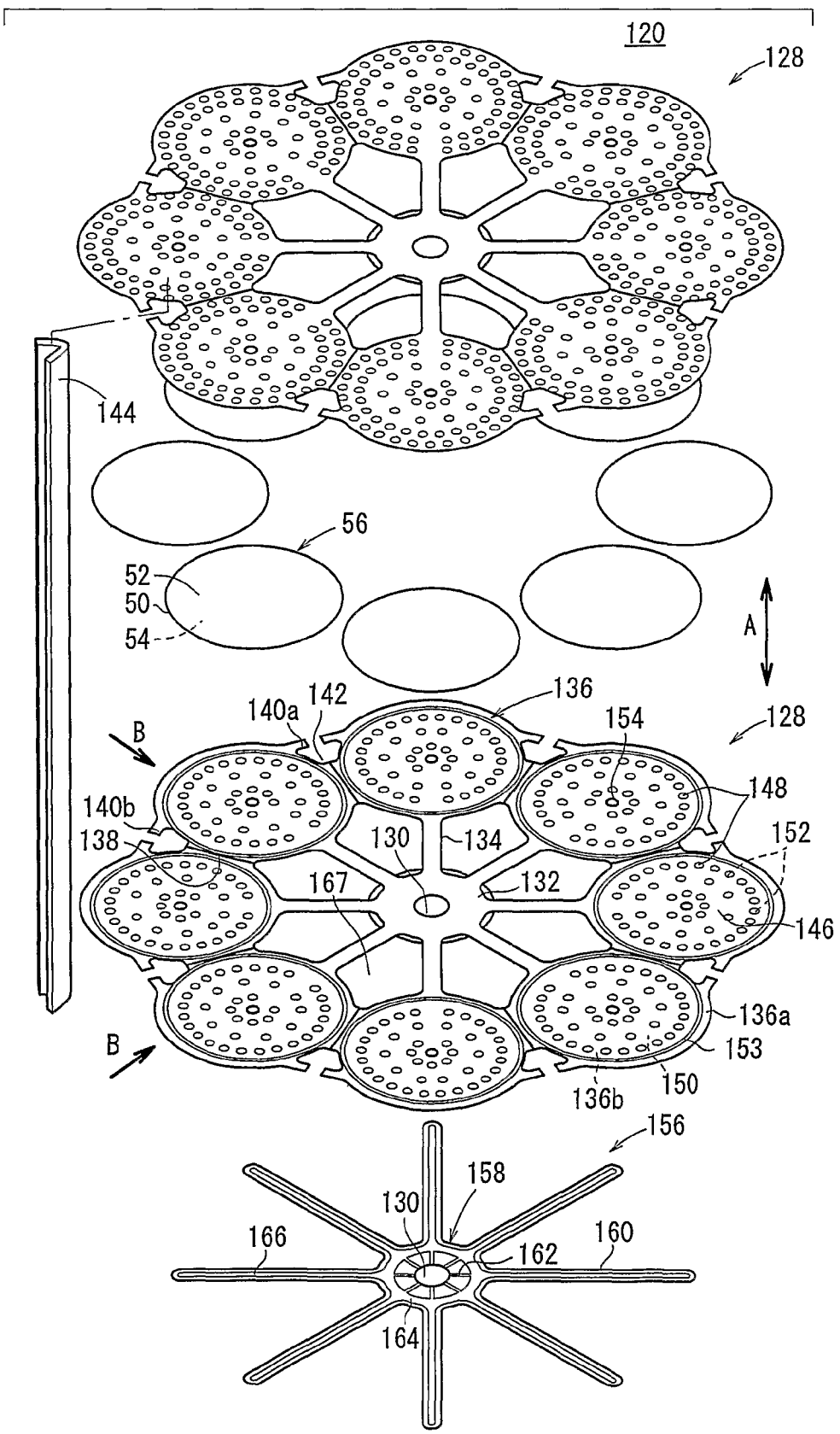
FIG. 13 is an exploded perspective view showing the fuel cell.
Figure 14:
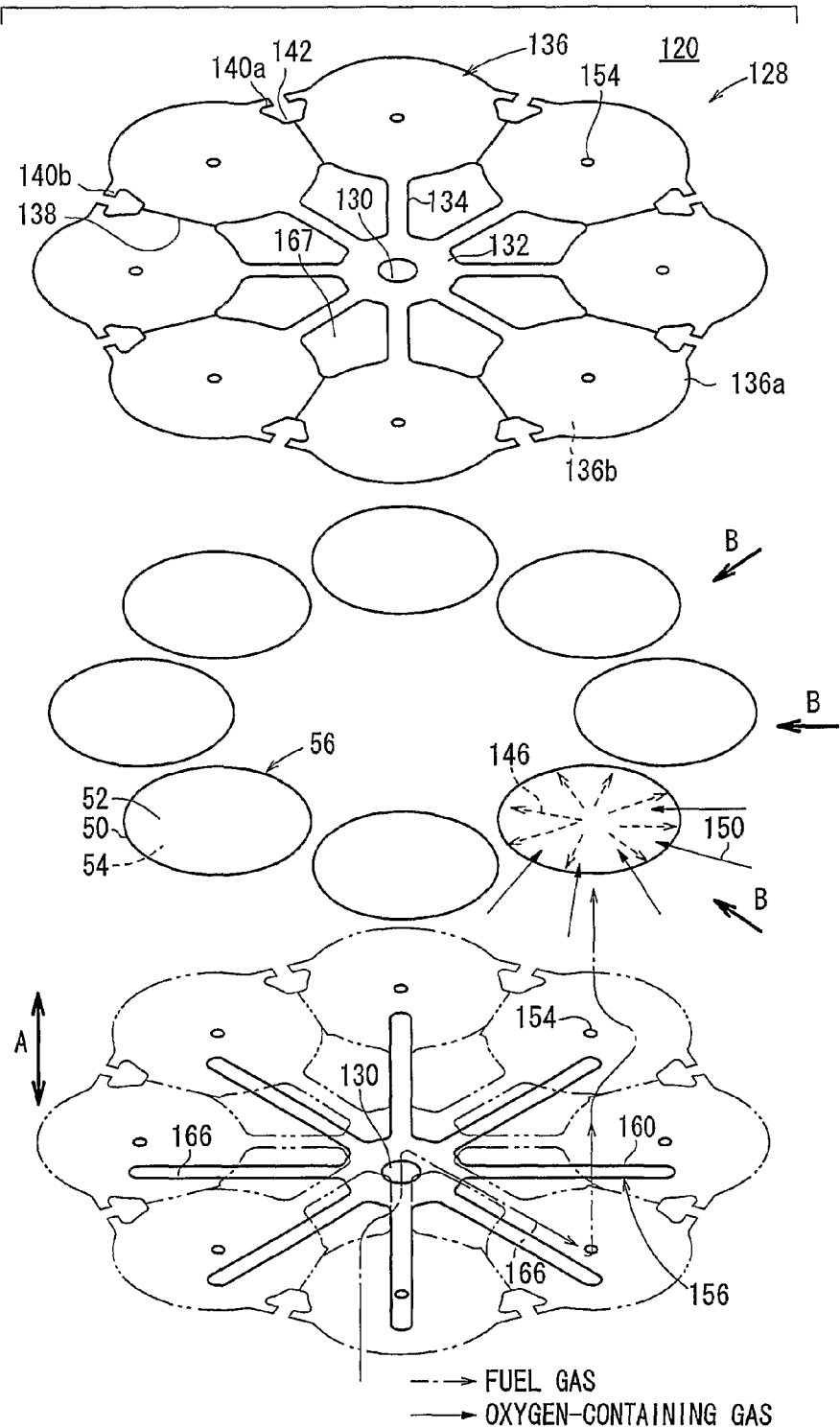
FIG. 14 is a partial exploded perspective view showing gas flows of the fuel cell.

As shown in FIGS. 13 and 14, a plurality of, e.g., eight electrolyte electrode assemblies 56 are interposed between a pair of separators 128 to form the fuel cell 120. The eight electrolyte electrode assemblies 56 are concentric with a fuel gas supply passage 130 extending through the center of the separators 128.

In FIG. 13, for example, each of the separators 128 comprises a metal plate of, e.g., stainless alloy or a carbon plate. The separator 128 has a first small diameter end portion 132. The fuel gas supply passage 130 extends through the center of the first small diameter end portion 132. The first small diameter end portion 132 is integral with circular disks 136 each having a relatively large diameter through a plurality of first bridges 134. The first bridges 134 extend radially outwardly from the first small diameter end portion 132 at equal angles (intervals). The circular disk 136 and the electrolyte electrode assembly 56 have substantially the same size.

As shown in FIGS. 13 and 14, the adjacent circular disks 136 are separated from each other through slits L38. Each of the circular disks 136 includes extensions 140a, 140b protruding toward the adjacent circular disks 136 on both sides, respectively. Spaces 142 are formed between the adjacent extensions 140a, 140b. Baffle plates 144 are provided in the respective spaces 142. The baffle plates 144 extend along the spaces 142 in the stacking direction.

Each of the circular disks 136 has first protrusions 148 on its surface 136a which contacts the anode 54. The first protrusions 148 form a fuel gas channel 146 for supplying a fuel gas along an electrode surface of the anode 54. Each of the circular disks 136 has second protrusions 152 on its surface 136b which contacts the cathode 52. The second protrusions 152 form the oxygen-containing gas channel 150 for supplying the oxygen-containing gas along an electrode surface of the cathode 52.

Figure 15:
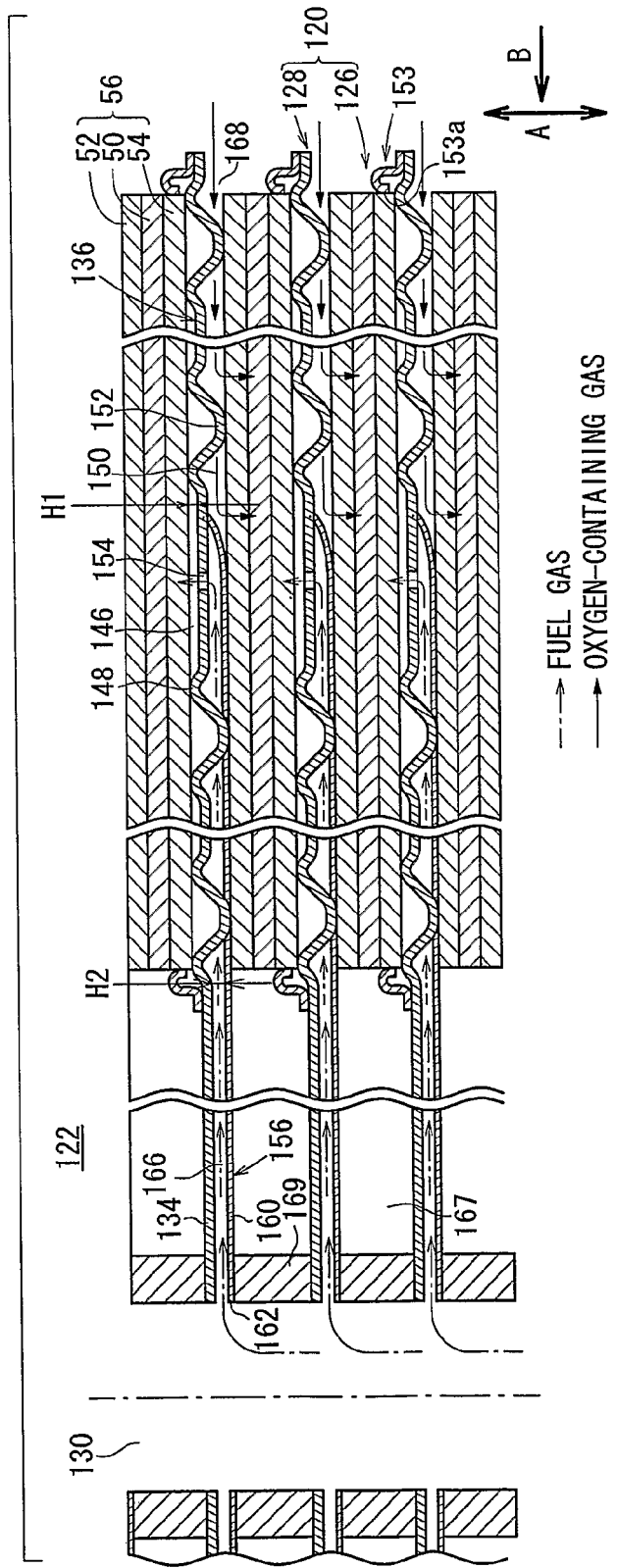
FIG. 15 is a cross sectional view of the fuel cell stack.
Figure 16:
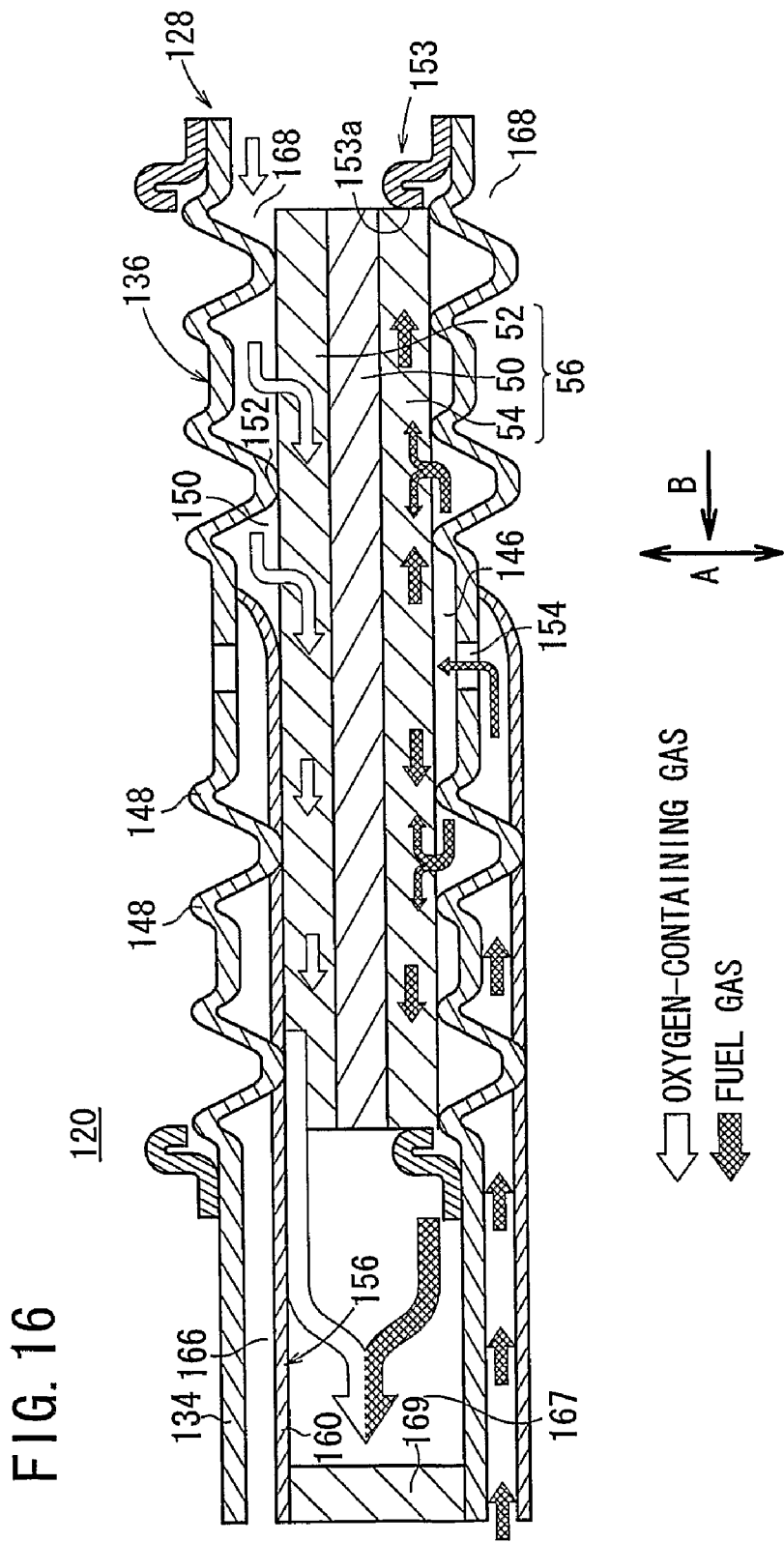
FIG. 16 is a cross sectional view schematically showing operation of the fuel cell.

As shown in FIGS. 15 and 16, the first and second protrusions 148, 152 are coaxial with each other. The first protrusions 148 are ring shaped protrusions, and the second protrusions 152 are mountain shaped protrusions. A plurality of the first and second protrusions 148, 152 are provided, and the height H1 of the first protrusion 148 is smaller than the height H2 of the second protrusion 152 (H1<H2). Therefore, the volume of the oxygen-containing gas channel 150 is larger than the volume of the fuel gas channel 146.

A stopper member 153 is fixed to each of the circular disks 136 by brazing, for example. The stopper member 153 contacts the outer circumferential region of the electrolyte electrode assembly 56. The stopper member 153 is made of elastically deformable metal, and has a substantially ring shape. A curved surface 153a is formed at the front end of the stopper member 153 on the open side. The curved surface 153a contacts the outer circumferential region of the anode 54 of the electrolyte electrode assembly 56. When the electrolyte electrode assembly 56 is supported by the stopper member 153, the curved surface 153a is elastically deformed to achieve air-tightness at the outer circumferential surface of the anode 54 of the electrolyte electrode assembly 56.

As shown in FIGS. 13 and 14, a fuel gas inlet 154 is provided in each of the circular disks 136. The fuel gas flows through the fuel gas inlet 154 into the fuel gas channel 146. The fuel gas is supplied from the central region of the anode 54. The position of the fuel gas inlet 154 is determined by the pressure of the fuel gas and the pressure of the oxygen-containing gas. For example, the fuel gas inlet 154 is provided at the center of the circular disk 136. Alternatively, the fuel gas inlet 154 may be provided at an upstream position deviated from the center of the circular disk 136 in the flow direction of the oxygen-containing gas indicated by the arrow B.

A channel member 156 is fixed to the separator 128 by brazing or laser welding on a surface facing the cathode 52. The channel member 156 includes a second small diameter end portion 158. The fuel gas supply passage 130 extends through the center of the second small diameter end portion 158. Eight second bridges 160 extend racially from the second small diameter end portion 158. Each of the second bridges 160 is fixed to the separator 128, from the first bridge 134 to the fuel gas inlet 154 of the circular disk 136.

A plurality of slits 162 are formed on the second small diameter end portion 158 of the channel member 156. The slits 162 are formed radially on a surface of the second small diameter end portion 158 which is joined to the separator 128. The slits 162 are connected to the fuel gas supply passage 130. Further, the slits 162 are connected to a recess 164 formed in the outer circumferential region of the second small diameter end portion 158. The recess 164 prevents the flow of the brazing material, and achieves the uniform flow of the fuel gas. A fuel gas supply channel 166 is formed between the first and second bridges 134, 160. The fuel gas supply channel 166 is connected to the fuel gas channel 146 through the slits 162 and the recess 164. The channel member 156 joined to each of the separators 128 has a curved cross section so that the second bridge 160 can be deformed elastically in the stacking direction indicated by the arrow A.

As shown in FIGS. 15 and 16, the oxygen-containing gas channel 150 is connected to an oxygen-containing gas supply unit 168. The oxygen-containing gas is supplied in the direction indicated by the arrow B through the space between the outer circumferential edge of the electrolyte electrode assembly 56 and the outer circumferential edge of the circular disk 136. The oxygen-containing gas supply unit 168 is provided in the space 142 between the extensions 140a, 140b of each of the circular disks 136. The baffle plate 144 provided in the space 142 between the extensions 140a, 140b prevents the entry of the oxygen-containing gas from a source other than the oxygen-containing gas supply unit 168.

As shown in FIG. 16, insulating seals 169 for sealing the fuel gas supply passage 130 is provided between the separators 128. For example, the insulating seals 169 are made of mica material, or ceramic material. Exhaust gas channels 167 extend through the fuel cells 120 in the stacking direction at positions internal from the respective circular disks 136.

As shown in FIG. 12, the fuel cell stack 122 includes a plurality of fuel cells 120 stacked together, and circular end plates 170a, 170b provided at opposite ends in the stacking direction. The fuel cells 120 of the fuel cell stack 122 are tightened together in the stacking direction by tightening bolts 172 and nuts 174. A fuel gas supply port 176 is provided at the center of the end plate 170a. The fuel gas supply port 176 is connected to each of the fuel cells 120 through the fuel gas supply passage 130.

The end plate 170a has eight circular openings 180 provided along a virtual circular line which is concentric with the fuel gas supply port 176. That is, the circular openings 180 are arranged at positions corresponding to the respective electrolyte electrode assemblies 56. The circular openings 180 are connected to rectangular openings 182 extending toward the fuel gas supply port 176. The rectangular openings 182 are partially overlapped with the exhaust gas channels 167. Therefore, the exhaust gas is discharged from the rectangular openings 182.

Next, operation of the fuel cell stack 122 will be described below.

As shown in FIG. 13, in assembling the fuel cell 120, firstly, the separator 128 is joined to the channel member 156 on its surface facing the cathode 52. Therefore, the fuel gas supply channel 166 connected to the fuel gas supply passage 130 is formed between the separator 128 and the channel member 156. The fuel gas supply channel 166 is connected to the fuel gas channel 146 through the fuel gas inlet 154 (see FIG. 15). The ring shaped insulating seal 169 is provided on each of the separators 128 around the fuel gas supply passage 130.

In this manner, the separator 128 is fabricated. The eight electrolyte electrode assemblies 56 are interposed between the separators 128 to form the fuel cell 120. As shown in FIGS. 13 and 14, the electrolyte electrode assemblies 56 are interposed between the surface 136a of one separator 128 and the surface 136b of the other separator 128. The fuel gas inlet 154 of the circular disk 136 is positioned at the center in each of the anodes 54.

A plurality of the fuel cells 120 are stacked in the direction indicated by the arrow A, and the end plates 170a, 170b are provided at opposite ends in the stacking direction. As shown in FIG. 12, the tightening bolts 172 are screwed into the nuts 174 of the end plates 170a, 170b for tightening the components between the end plates 170a, 170b. Thus, the fuel cell stack 122 is produced.

The fuel gas flows along the fuel gas supply channel 166 between the first and second bridges 134, 160, and flows into the fuel gas channel 146 through the fuel gas inlet 154 of the circular disk 136. The fuel gas inlet 154 is positioned at the substantially central position of the anode 54 in each of the electrolyte electrode assemblies 56. Alternatively, the fuel gas inlet 154 may be provided at an upstream position deviated from the central position of the anode 54 in the flow direction of the oxygen-containing gas indicated by the arrow B. Therefore, the fuel gas is supplied to the central region of the anode 54 from the fuel gas inlet 154. The fuel gas flows from the central region of the anode 54 to the outer circumferential region of the anode 54 along the fuel gas channel 146 (see FIG. 16).

The oxygen-containing gas is supplied to the oxygen-containing gas supply unit 168 in the outer circumferential region in each of the fuel cells 120. The oxygen-containing gas flows into the space between the outer circumferential region of the electrolyte electrode assembly 56 and the outer circumferential region of the circular disk 136 in the direction indicated by the arrow B, and flows toward the oxygen-containing gas channel 150. As shown in FIGS. 15 and 16, in the oxygen-containing gas channel 150, the oxygen-containing gas flows from one end of the outer circumferential region (outer region of the separator 128) to the other end of the outer circumferential region (central region of the separator 128) of the cathode 52 of the electrolyte electrode assembly 56.

Thus, in the electrolyte electrode assembly 56, the fuel gas flows from the central region to the outer circumferential region of the anode 54, and the oxygen-containing gas flows in one direction indicted by the arrow B on the electrode surface of the cathode 52 (see FIG. 16). At this time, oxygen ions flow through the electrolyte 50 toward the anode 54 for generating electricity by electrochemical reactions.

In the second embodiment, as shown in FIGS. 15 and 16, the outer circumferential region of the anode 54 of the electrolyte electrode assembly 56 elastically, and slidably contacts the curved surface 153a of the stopper member 153 fixed to the circular disk 136. Therefore, the outer circumferential region of the anode 54 is not exposed to the exhaust gas discharged to the outside of the electrolyte electrode assembly 56. It is possible to achieve the sufficient effective surface area of the anode 54. Therefore, the same advantages as in the case of the first embodiment can be achieved. For example, with the simple and economical structure, it is possible to effectively improve the power generation efficiency.

Figure 17:
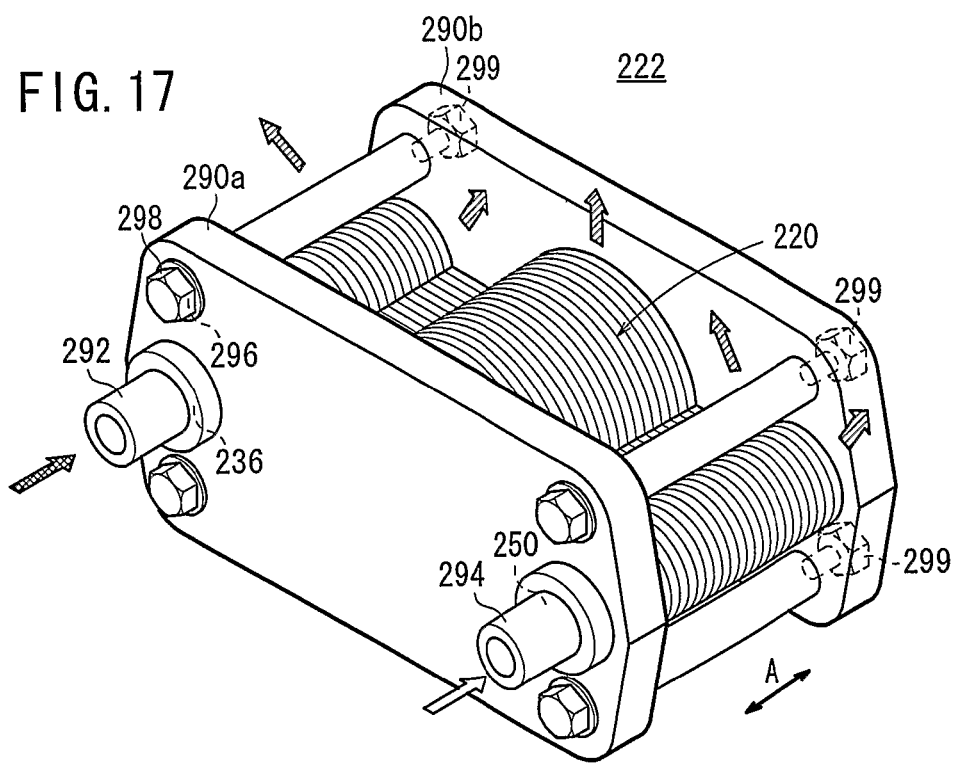
FIG. 17 is a perspective view schematically showing a fuel cell stack formed by stacking a plurality of fuel cells according to a third embodiment of the present invention.

FIG. 17 is a perspective view schematically showing a fuel cell stack 222 formed by stacking a plurality of fuel cells 220 according to a third embodiment of the present invention.

Figure 18:
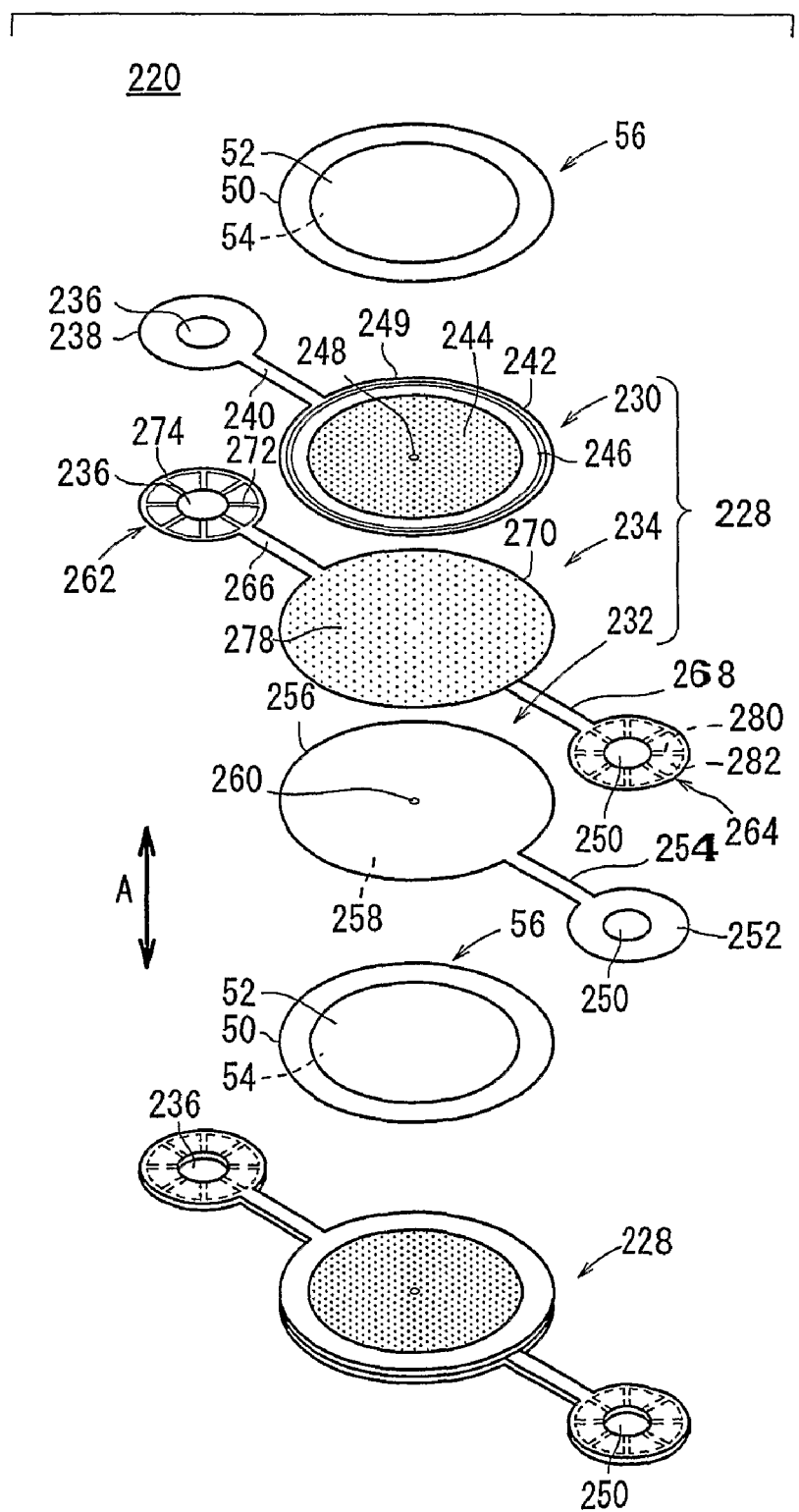
FIG. 18 is an exploded perspective view showing the fuel cell.
Figure 19:
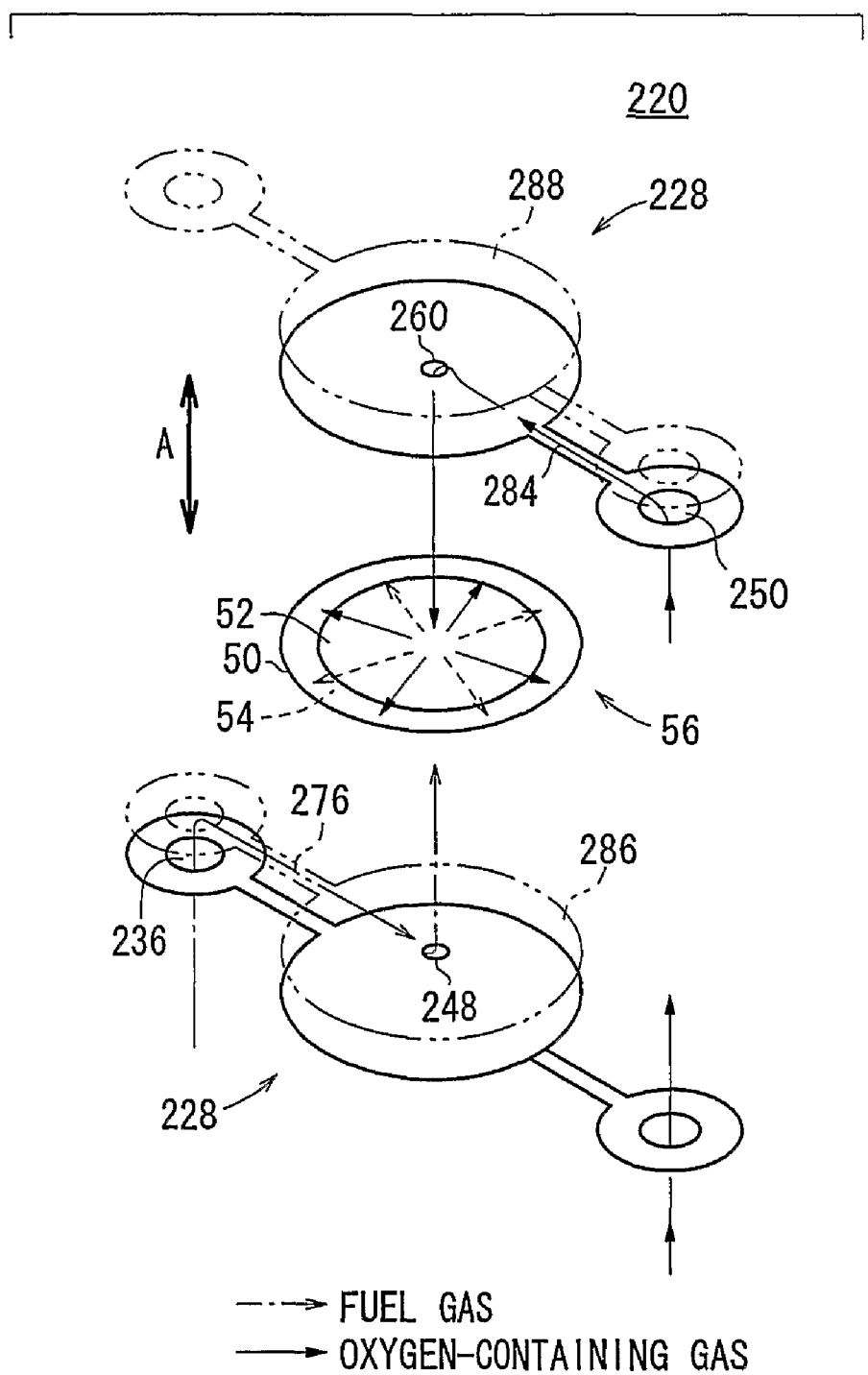
FIG. 19 is a partial exploded perspective view showing gas flows of the fuel cell.
Figure 20:
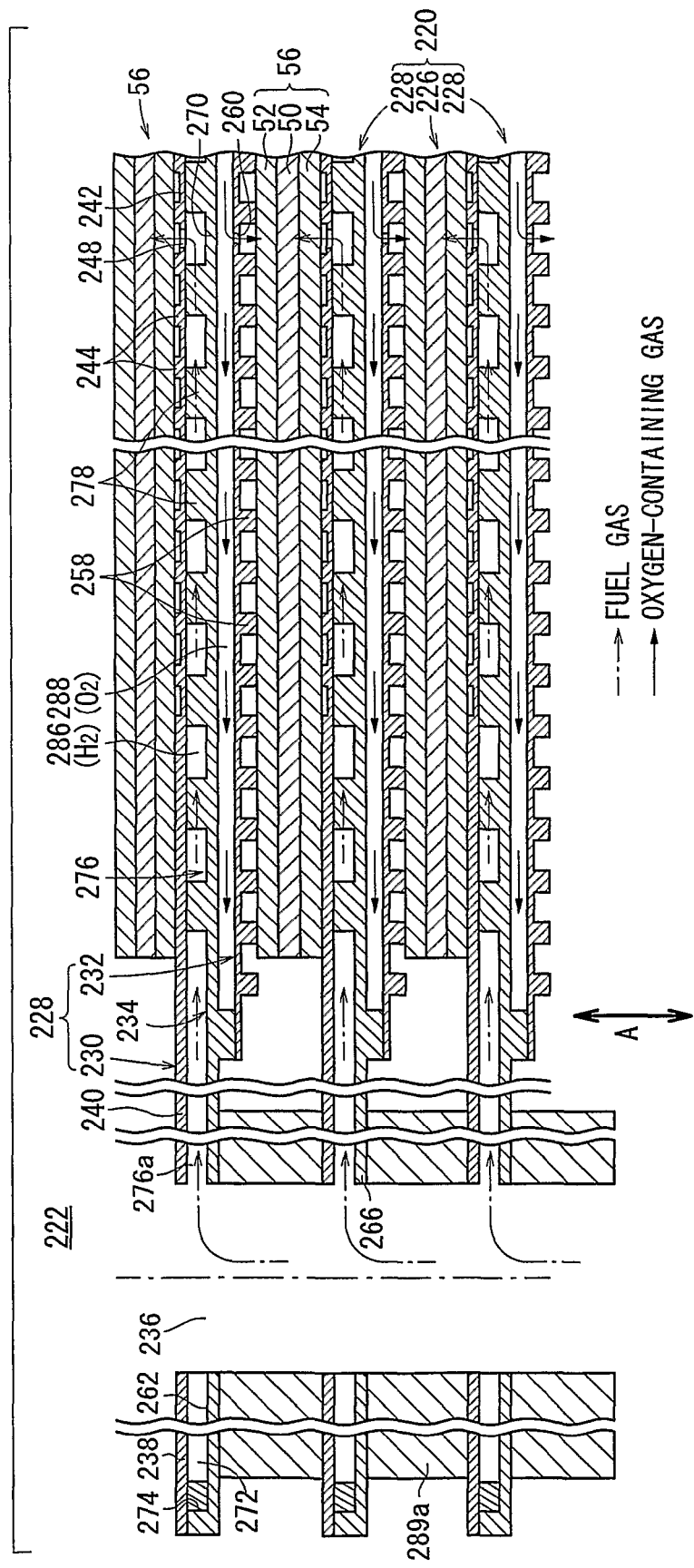
FIG. 20 is an expanded cross sectional view of the fuel cell showing a position near a fuel gas supply passage.

As shown in FIGS. 18 to 20, the fuel cell 220 is formed by sandwiching the electrolyte electrode assembly 56 between a pair of separators 228. The separator 228 includes first and second plates 230, 232, and a third plate 234 interposed between the first and second plates 230, 232. For example, the first through third plates 230, 232, 234 are metal plates of, e.g., stainless alloy. The first plate 230 and the second plate 232 are joined to both surfaces of the third plate 234 by brazing, for example.

As shown in FIG. 18, the first plate 230 has a first small diameter end portion 238. A fuel gas supply passage 236 for supplying a fuel gas in the stacking direction indicated by the arrow A extends through the first small diameter end portion 238. The first small diameter end portion 238 is integral with a first circular disk 242 having a relatively large diameter through a narrow bridge 240.

A large number of first protrusions 244 are formed on a surface of the first circular disk 242 which contacts the anode 54, in a central region adjacent to an outer circumferential region. A substantially ring shaped protrusion 246 is provided on the outer circumferential region of the first circular disk 242. The first protrusions 244 and the substantially ring shaped protrusion 246 jointly function as a current collector. A fuel gas inlet 248 is provided at the center of the first circular disk 242 for supplying the fuel gas toward substantially the central region of the anode 54. The first protrusions 244 may be formed by making a plurality of recesses in a surface which is in the same plane with the surface of the substantially ring shaped protrusion 246.

Figure 21:
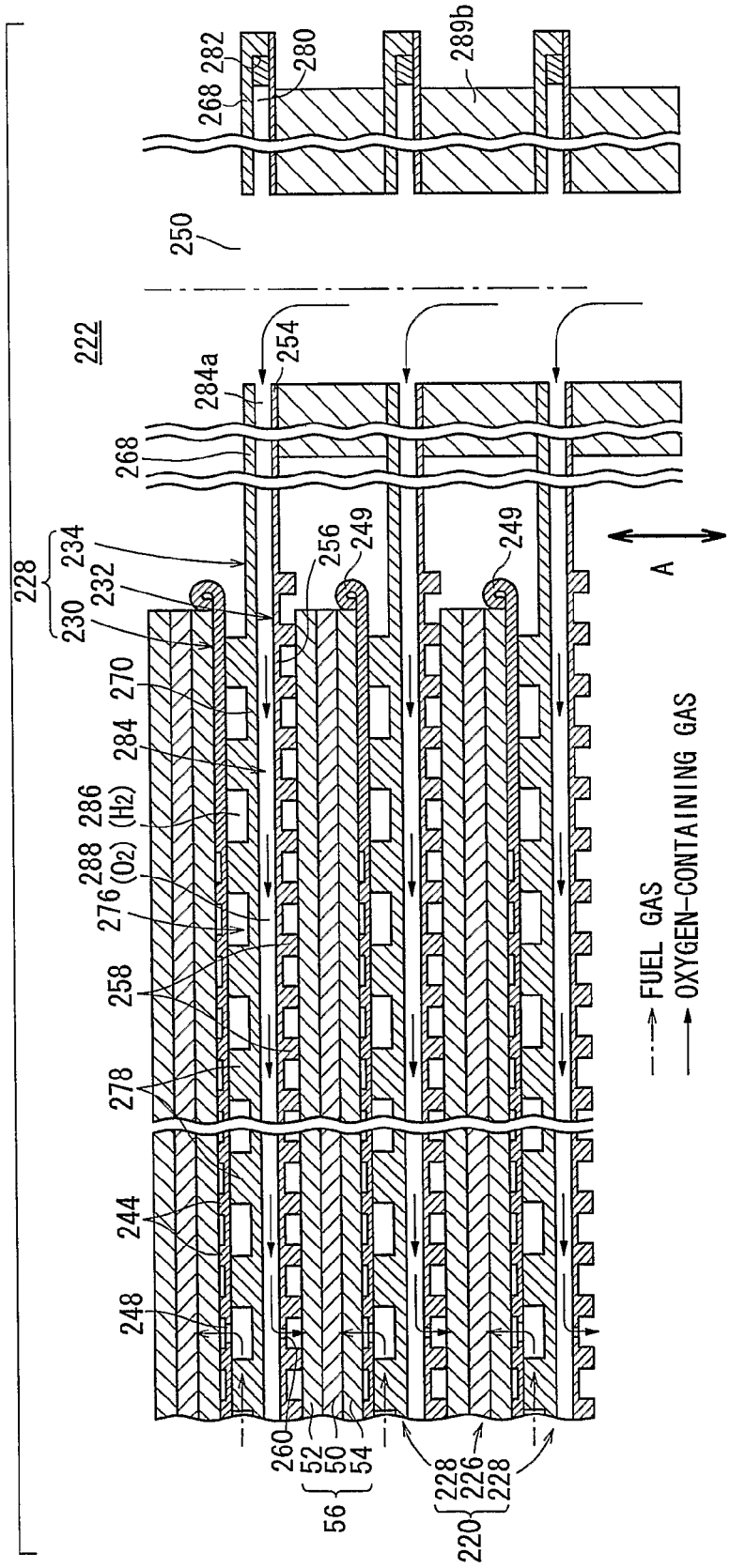
FIG. 21 is an expanded cross sectional view of the fuel cell showing a position near an oxygen-containing gas supply passage.
Figure 22:
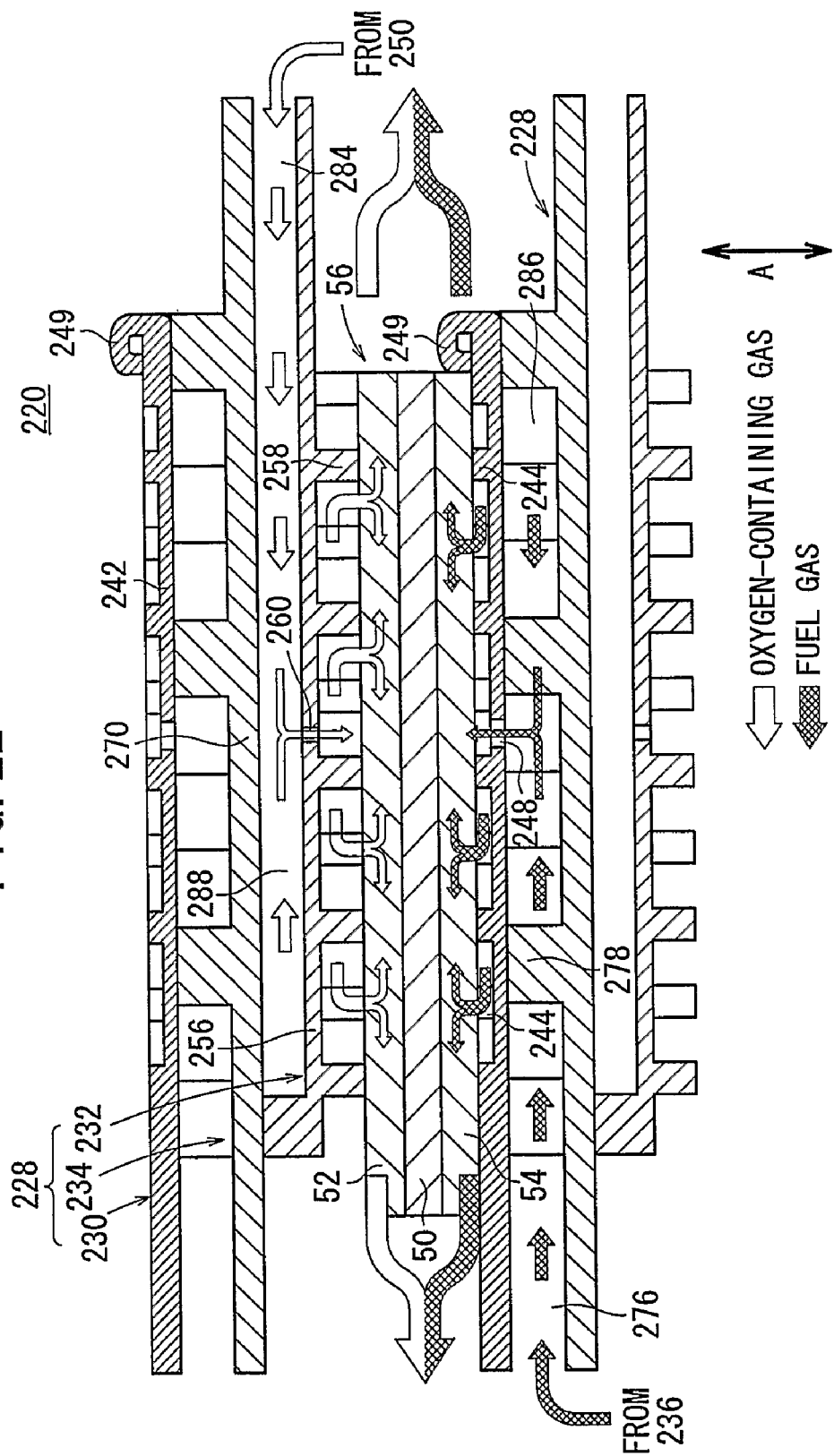
FIG. 22 is a cross sectional view schematically showing operation of the fuel cell.
Figure 23:
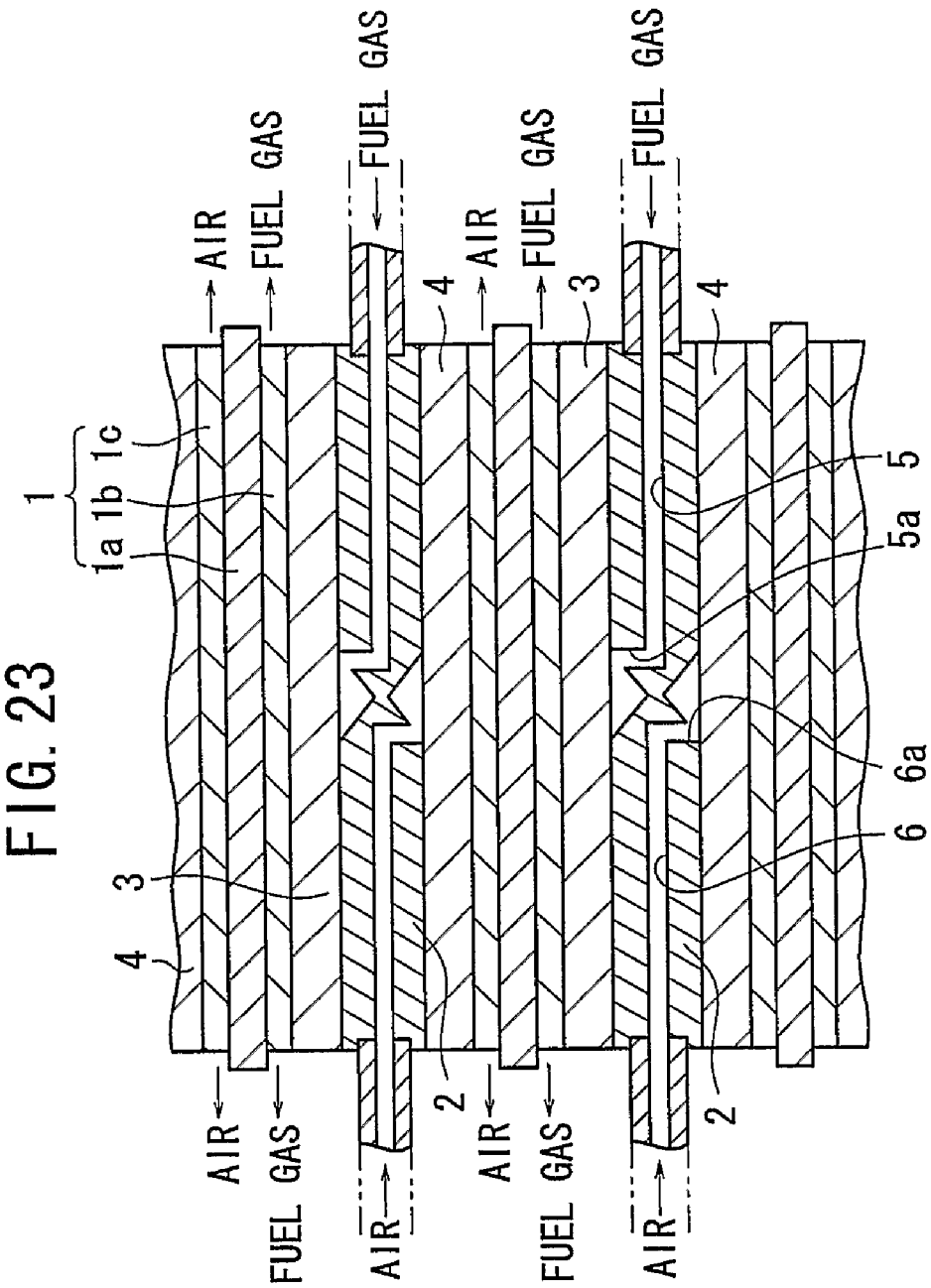
FIG. 23 is a cross sectional view showing a fuel cell according to the conventional technique.

As shown in FIGS. 21 and 22, an end of the substantially ring shaped protrusion 246 of the first plate 230 is folded to form a curved stopper 249. The curved stopper 249 has a substantially ring shape. The open end inside the curved stopper 249 elastically, and slidably contacts the outer circumferential region of the anode 54 of the electrolyte electrode assembly 56.

The second plate 232 has a second small diameter end portion 252. An oxygen-containing gas supply passage 250 for supplying an oxygen-containing gas in the stacking direction indicated by the arrow A extends through the second small diameter end portion 252. The second small diameter end portion 252 is integral with a second circular disk 256 having a relatively large diameter through a narrow bridge 254.

A plurality of second protrusions 258 are formed on the entire surface of the second circular disk 256 which contacts the cathode 52 of the electrolyte electrode assembly 56. The second protrusions 258 function as a current collector. An oxygen-containing gas inlet 260 is provided at the center of the second circular disk 256 for supplying the oxygen-containing gas toward the substantially central region of the cathode 52.

The third plate 234 includes a third small diameter end portion 262 and a fourth small diameter end portion 264. The fuel gas supply passage 236 extends through the third small diameter end portion 262, and the oxygen-containing gas supply passage 250 extends through the fourth small diameter end portion 264. The third and fourth small diameter end portions 262, 264 are integral with a third circular disk 270 having a relatively large diameter through narrow bridges 266, 268, respectively. The first through third circular disks 242, 256, 270 have the same diameter.

The third plate 234 has a plurality of slits 272 radially formed in the third small diameter end portion 262, on a surface facing the first plate 230. The slits 272 are connected to the fuel gas supply passage 236. Further, the slits 272 are connected to a recess 274 formed in an outer circumferential region of the third small diameter end portion 262. The recess 274 prevents the entry of brazing material into the slits 272, and into an area inside the recess 274. A fuel gas channel 276 is formed in the bridge 266 and in the surface of the third circular disk 270 (see FIG. 20). The fuel gas flows from the fuel gas supply passage 236 to the fuel gas channel 276 through the slits 272. A plurality of third protrusions 278 are formed on the third circular disk 270, and the third protrusions 278 are part of the fuel gas channel 276.

The third plate 234 has a plurality of slits 280 radially formed in the fourth small diameter end portion 264, on a surface which contacts the second plate 232. The slits 280 are connected to the oxygen-containing gas supply passage 250. Further, the slits 280 are connected to a recess 282 (see FIGS. 18 and 21). The recess 282 prevents the entry of brazing material into slits 280, and into an area inside the recess 282. An oxygen-containing gas channel 284 is formed in the third circular disk 270. The oxygen-containing gas flows from the oxygen-containing gas supply passage 250 through the slits 280 into the third circular disk 270. The oxygen-containing gas channel 284 is closed by the outer circumferential region of the third circular disk 270.

The first plate 230 is joined to one surface of the third plate 234 by brazing to form the fuel gas channel 276 connected to the fuel gas supply passage 236 between the first and third plates 230, 234. The bridge 240 of the first plate 230 and the bridge 266 of the third plate 234 are joined together to form a fuel gas channel member, and a fuel gas distribution passage 276a as part of the fuel gas channel 276 is formed in the fuel gas channel member (see FIG. 20).

The fuel gas channel 276 is provided between the first and third circular disks 242, 270, over the electrode surface of the anode 54. The first circular disk 242 is provided between the fuel gas channel 276 and the anode 54, and the fuel gas is supplied to the fuel gas channel 276. That is, a fuel gas pressure chamber 286 is formed such that the first circular disk 242 tightly contacts the anode 54 under pressure (see FIGS. 20 and 21).

The second plate 232 is joined to the third plate 234 by brazing to form the oxygen-containing gas channel 284 connected to the oxygen-containing gas supply passage 250 between the second and third plates 232, 234 (see FIG. 21). The bridge 254 of the second plate 232 and the bridge 268 of the third plate 234 are joined together to form an oxygen-containing gas channel member, and an oxygen-containing gas distribution passage 284a as part of the oxygen-containing gas channel 284 is formed in the oxygen-containing gas channel member.

The oxygen-containing gas channel 284 is provided between the second and third circular disks 256, 270, over the electrode surface of the cathode 52. The second circular disk 256 is provided between the oxygen-containing gas channel 284 and the cathode 52, and the oxygen-containing gas is supplied to the oxygen-containing gas channel 284. That is, an oxygen-containing gas pressure chamber 288 is formed such that the second circular disk 256 tightly contacts the cathode 52 under pressure (see FIGS. 20 and 21).

Insulating seals 289a for sealing the fuel gas supply passage 236 and insulating seals 289b for sealing the oxygen-containing gas supply passage 250 are provided between the separators 228. For example, the insulating seals 289a, 289b are made of mica material, or ceramic material.

As shown in FIG. 17, the fuel cell stack 222 includes end plates 290a, 290b provided at opposite ends of the fuel cells 220 in the stacking direction. The end plate 290a or the end plate 290b are electrically insulated from tightening bolts 298. A first pipe 292 and a second pipe 294 extend through the end plate 290a. The first pipe 292 is connected to the fuel gas supply passage 236, and the second pipe 294 is connected to the oxygen-containing gas supply passage 250. The end plates 290a, 290b have bolt holes 296 at positions above and under the fuel gas supply passage 236, and at positions above and under the oxygen-containing gas supply passage 250. Tightening bolts 298 are inserted into the respective bolt holes 296, and tip ends of the respective tightening bolts 298 are screwed into nuts 299 for tightening the fuel cell stack 222.

Next, operation of the fuel cell stack 222 will be described below.

As shown in FIG. 18, in assembling the fuel cell 220, firstly, the first plate 230 of the separator 228 is joined to one surface of the third plate 234, and the second plate 232 is joined to the other surface of the third plate 234. Thus, the third plate 234 divides a space in the separator 228 to form the fuel gas channel 276 connected to the fuel gas supply passage 236 and the oxygen-containing gas channel 284 connected to the oxygen-containing gas supply passage 250 separately (see FIGS. 19 and 21).

Further, the fuel gas pressure chamber 286 is formed between the first and third circular disks 242, 270, and the oxygen-containing gas pressure chamber 288 is formed between the second and third circular disks 256, 270 (see FIG. 22).

Then, the separators 228 and the electrolyte electrode assemblies 56 are stacked alternately, and the end plates 290a, 290b are provided at the opposite ends in the stacking direction. The end plate 290a or the end plate 290b is electrically insulated from the tightening bolts 298. The tightening bolts 298 are inserted into the respective bolt holes 296 of the end plates 290a, 290b, and the tip ends of the tightening bolts 298 are screwed into the nuts 299 to form the fuel cell stack 222 (see FIG. 17).

The fuel gas is supplied to the first pipe 292 connected to the end plate 290a, and flows from the first pipe 292 to the fuel gas supply passage 236. The oxygen-containing gas is supplied to the second pipe 294 connected to the end plate 290a, and the oxygen-containing gas flows from the second pipe 294 to the oxygen-containing gas supply passage 250.

As shown in FIG. 20, after the fuel gas flows into the fuel gas supply passage 236, the fuel gas flows in the stacking direction indicated by the arrow A, and is supplied to the fuel gas channel 276 in the separator 228 in each of the fuel cells 220. The fuel gas flows along the fuel gas channel 276, and flows into the fuel gas pressure chamber 286 between the first and third circular disks 242, 270. The fuel gas flows between the third protrusions 278, and flows into the fuel gas inlet 248 at the central position of the first circular disk 242.

The fuel gas inlet 248 is provided at a position corresponding to the central position of the anode 54 in each of the electrolyte electrode assemblies 56. Therefore, as shown in FIG. 22, the fuel gas from the fuel gas inlet 248 is supplied to the anode 54, and flows from the central region of the anode 54 toward the outer circumferential region of the anode 54.

As shown in FIG. 21, after the oxygen-containing gas flows into the oxygen-containing gas supply passage 250, the oxygen-containing gas flows through the oxygen-containing gas channel 284 in the separator 228, and is supplied to the oxygen-containing gas pressure chamber 288 between the second and third circular disks 256, 270. The oxygen-containing gas flows into the oxygen-containing gas inlet 260 at the central position of the second circular disk 256.

The oxygen-containing gas inlet 260 is provided at a position corresponding to the central position of the cathode 52 in each of the electrolyte electrode assemblies 56. Therefore, as shown in FIG. 22, the oxygen-containing gas from the oxygen-containing gas inlet 260 is supplied to the cathode 52, and flows from the central region of the cathode 52 to the outer circumferential region of the cathode 52.

Thus, in each of the electrolyte electrode assemblies 56, the fuel gas is supplied from the central region of the anode 54 to the outer circumferential region of the anode 54, and the oxygen-containing gas is supplied from the central region of the cathode 52 to the outer circumferential region of the cathode 52 for generating electricity. After the fuel gas and the oxygen-containing gas are consumed in the power generation, the fuel gas and the oxygen-containing gas are discharged as an exhaust gas from the outer circumferential regions of the first through third circular disks 242, 256, and 270.

In the third embodiment, the outer circumferential end of the first plate 230 is folded to form the curved stopper 249. The curved stopper 249 elastically, and slidably contacts the outer circumferential region of the anode 54 of the electrolyte electrode assembly 56. Therefore, the exhaust gas discharged to the outside of the electrolyte electrode assembly 56 does not flow around to the outer circumferential region of the anode 54 of the electrolyte electrode assembly 56. Thus, the same advantages as in the first and second embodiments can be obtained. For example, with the simple and economical structure, it is possible to effectively improve the power generation efficiency.

In the first to third embodiments, the stopper 81, the stopper member 153, and the curved stopper 249 have been described. However, the present invention is not limited to in this respect, and these three structures can be selectively adopted in the first to third embodiments. In the third embodiment, the end of the first plate 230 is folded inwardly. Alternatively, the outer circumferential end of the first plate 230 may be cut away partially, and folded.

INDUSTRIAL APPLICABILITY

According to the present invention, the outer circumferential region of the anode is not exposed to the exhaust gas. It is possible to achieve the sufficient effective surface area of the anode needed for power generation. With the simple and economical structure, the entire anode can be utilized desirably, and the power generation efficiency can be improved effectively.

The invention claimed is:

1. A fuel cell comprising an electrolyte electrode assembly and a pair of separators sandwiching said electrolyte electrode assembly, said electrolyte electrode assembly including an anode, a cathode, and an electrolyte interposed between said anode and said cathode, wherein
a fuel gas is supplied from a central region to an outer circumferential region of said anode, an oxygen-containing gas is supplied to said cathode, and an exhaust gas as a mixed gas of said fuel gas and said oxygen-containing gas after consumption is discharged to the outside of an outer circumferential region of said electrolyte electrode assembly; and
a stopper is formed integrally with said separator, and said stopper contacts said anode in the outer circumferential region of said electrolyte electrode assembly to prevent exposure of said anode to said exhaust gas,
wherein the stopper is formed continuously along the outer circumferential region of the electrolyte electrode assembly.

2. A fuel cell according to claim 1, wherein said stopper includes a guide inclined surface inclined from a side of said anode to a side of said cathode, toward the outside of said electrolyte electrode assembly.

3. A fuel cell according to claim 2, wherein said electrolyte electrode assembly includes an anode inclined surface on the outer circumferential region of said anode, and said anode inclined surface contacts said guide inclined surface; and
an inclination angle of said guide inclined surface is greater than an inclination angle of said anode inclined surface.

4. A fuel cell according to claim 1, wherein said stopper is formed by partially folding said separator.

5. A fuel cell according to claim 1, wherein said stopper has a ring shape formed around the outer circumferential region of said electrolyte electrode assembly.

6. A fuel cell according to claim 1, wherein said separator comprises a single plate;
first protrusions are provided on one surface of said separator to form a fuel gas channel for supplying said fuel gas along an electrode surface of said anode; and
second protrusions are provided on the other surface of said separator to form an oxygen-containing gas channel for supplying said oxygen-containing gas along an electrode surface of said cathode.

7. A fuel cell according to claim 1, wherein said separator includes first and second plates which are stacked together; and
a fuel gas channel for supplying said fuel gas to said anode, and an oxygen-containing gas channel for supplying said oxygen-containing gas to said cathode are formed between said first and second plates such that said fuel gas flows along said anode facing one surface of said separator, and said oxygen-containing gas flows along said cathode facing the other surface of said separator.

8. A fuel cell according to claim 1, wherein said separator includes first, second, and third plates which are stacked together;
said third plate is interposed between said first and second plates;
a fuel gas channel for supplying said fuel gas is formed between said first plate and said anode;
an oxygen-containing gas channel for supplying said oxygen-containing gas is formed between said second plate and said cathode; and
said third plate divides said fuel gas channel and said oxygen-containing gas channel separately.

9. A fuel cell comprising an electrolyte electrode assembly and a pair of separators sandwiching said electrolyte electrode assembly, said electrolyte electrode assembly including an anode, a cathode, and an electrolyte interposed between said anode and said cathode, wherein
a fuel gas is supplied from a central region to an outer circumferential region of said anode, an oxygen-containing gas is supplied to said cathode, and an exhaust gas as a mixed gas of said fuel gas and said oxygen-containing gas after consumption is discharged to the outside of an outer circumferential region of said electrolyte electrode assembly; and
said separator has an elastically deformable stopper member which contacts said anode in the outer circumferential region of said electrolyte electrode assembly to prevent exposure of said anode to said exhaust gas.

10. A fuel cell according to claim 9, wherein said stopper member has a curved surface formed on a front end on the open side, and said curved surface contacts the outer circumferential region of said electrolyte electrode assembly.

11. A fuel cell according to claim 10, wherein said separator comprises a single plate;
first protrusions are provided on one surface of said separator to form a fuel gas channel for supplying said fuel gas along an electrode surface of said anode; and
second protrusions are provided on the other surface of said separator to form an oxygen-containing gas channel for supplying said oxygen-containing gas along an electrode surface of said cathode.

12. A fuel cell according to claim 10, wherein said separator includes first and second plates which are stacked together; and
a fuel gas channel for supplying said fuel gas to said anode, and an oxygen-containing gas channel for supplying said oxygen-containing gas to said cathode are formed between said first and second plates such that said fuel gas flows along said anode facing one surface of said separator, and said oxygen-containing gas flows along said cathode facing the other surface of said separator.

13. A fuel cell according to claim 10, wherein said separator includes first, second, and third plates which are stacked together;
said third plate is interposed between said first and second plates;
a fuel gas channel for supplying said fuel gas is formed between said first plate and said anode;
an oxygen-containing gas channel for supplying said oxygen-containing gas is formed between said second plate and said cathode; and
said third plate divides said fuel gas channel and said oxygen-containing gas channel separately.

\* \* \* \* \*